United States Patent
Barnes et al.

(12) 
(10) Patent No.: US 11,681,636 B2
(45) Date of Patent: Jun. 20, 2023

(54) RANDOM TAG SETTING INSTRUCTION FOR A TAG-GUARDED MEMORY SYSTEM

(71) Applicant: Arm Limited, Cambridge (GB)

(72) Inventors: Graeme Peter Barnes, Cambridge (GB); Jasen Milov Borisov, Cambridge (GB)

(73) Assignee: Arm Limited, Cambridge (GB)

( * ) Notice: Subject to any disclaimer, the term of this patent is extended or adjusted under 35 U.S.C. 154(b) by 11 days.

(21) Appl. No.: 16/981,816

(22) PCT Filed: Feb. 12, 2019

(86) PCT No.: PCT/GB2019/050372
§ 371 (c)(1),
(2) Date: Sep. 17, 2020

(87) PCT Pub. No.: WO2019/180402
PCT Pub. Date: Sep. 26, 2019

(65) Prior Publication Data
US 2021/0019268 A1 Jan. 21, 2021

(30) Foreign Application Priority Data
Mar. 20, 2018 (GB) ...................................... 1804411

(51) Int. Cl.
*G06F 12/14* (2006.01)
*G06F 7/58* (2006.01)
(Continued)

(52) U.S. Cl.
CPC .......... *G06F 12/1441* (2013.01); *G06F 7/582* (2013.01); *G06F 9/3004* (2013.01);
(Continued)

(58) Field of Classification Search
None
See application file for complete search history.

(56) References Cited

U.S. PATENT DOCUMENTS

| 4,241,396 A |  | 12/1980 | Mitchell et al. |  |
| 5,371,875 A | * | 12/1994 | Eikill | G06F 12/1425 |
|  |  |  |  | 711/E12.099 |

(Continued)

FOREIGN PATENT DOCUMENTS

| CN | 107491397 | 12/2017 |
| EP | 2 211 285 | 7/2010 |

(Continued)

OTHER PUBLICATIONS

Zeldovich et al. "Hardware Enforcement of Application Security Policies Using Tagged Memory." Dec. 2008. USENIX. OSDI '08. pp. 225-240.*

(Continued)

*Primary Examiner* — Nathan Sadler
(74) *Attorney, Agent, or Firm* — Nixon & Vanderhye P.C.

(57) ABSTRACT

An apparatus has processing circuitry (4); memory access circuitry (15) to perform a guard tag check for a tag checking target address having an associated address tag, the guard tag check comprising comparing the address tag with a guard tag stored in a memory system in association with a block of one or more memory locations comprising an addressed location identified by the target address; and an instruction decoder (6) responsive to a random tag setting instruction specifying a tag setting target address, to control the processing circuitry (4) to set the address tag associated with the tag setting target address to a random tag value randomly selected from a set of candidate tag values.

18 Claims, 14 Drawing Sheets

(51) Int. Cl.
*G06F 9/30* (2018.01)
*G06F 21/79* (2013.01)
*G06F 12/0842* (2016.01)
*G06F 12/0853* (2016.01)
*G06F 12/0897* (2016.01)
*G06F 12/1027* (2016.01)

(52) U.S. Cl.
CPC ...... *G06F 9/30076* (2013.01); *G06F 9/30101* (2013.01); *G06F 9/30145* (2013.01); *G06F 12/0842* (2013.01); *G06F 12/0853* (2013.01); *G06F 12/0897* (2013.01); *G06F 12/1027* (2013.01); *G06F 21/79* (2013.01)

(56) References Cited

U.S. PATENT DOCUMENTS

| 9,495,305 | B1 | 11/2016 | Fuchs | |
|---|---|---|---|---|
| 11,327,903 | B2* | 5/2022 | Barnes | G06F 9/30145 |
| 2006/0225135 | A1 | 10/2006 | Cheng et al. | |
| 2008/0140968 | A1* | 6/2008 | Doshi | G06F 12/1466 |
| | | | | 711/E12.091 |
| 2012/0036509 | A1 | 2/2012 | Srinivasan et al. | |
| 2017/0083255 | A1 | 3/2017 | Chiricescu et al. | |
| 2020/0233816 | A1* | 7/2020 | Barnes | G06F 9/30145 |

FOREIGN PATENT DOCUMENTS

| EP | 3916568 A1 * | 12/2021 | ......... G06F 12/1441 |
|---|---|---|---|
| GB | 2549511 A * | 10/2017 | ......... G06F 12/1441 |
| TW | 201631475 | 9/2016 | |
| WO | 2016/060817 | 4/2016 | |

OTHER PUBLICATIONS

François Koeune. "Pseudorandom Number Generator." Encyclopedia of Cryptography and Security. 2011. Springer. 2nd ed. pp. 994-996.*
Liu et al. "TMDFI: Tagged Memory Assisted for Fine-grained Data-Flow Integrity towards Embedded Systems against Software Exploitation." Aug. 2018. pp. 545-550.*
International Search Report and Written Opinion of the ISA for PCT/GB2019/050372, dated Apr. 29, 2019, 17 pages.
Search Report for GB1804411.5, dated Oct. 16, 2018, 4 pages.
R. Gumpertz, "Error Detection with Memory Tags" *Dissertations*, paper 533, Dec. 1981, 119 pages.
R. Bedichek, "Some Efficient Architecture Simulation Techniques," Proceedings of the Winter 1990 USENIX Conference, Jan. 22-26, 1990, 12 pages.
A. Azevedo de Amorim et al., "The Meaning of Memory Safety", Post 2018, LNCS 10804, 2018, pp. 79-105.
Office Action for IN Application No. 202047045068 dated Jul. 25, 2022, 7 pages.
Office Action for TW Application No. 108105795 dated Nov. 3, 2022 and English translation, 16 pages.
Office Action for IL Application No. 276897 dated Dec. 26, 2022, 4 pages.
Office Action for JP Application No. 2020-548809 dated Apr. 7, 2023 and English translation, 14 pages.

* cited by examiner

RANDOM TAG SETTING INSTRUCTION FOR A TAG-GUARDED MEMORY SYSTEM

This application is the U.S. national phase of International Application No. PCT/GB2019/050372 filed 12 Feb. 2019, which designated the U.S. and claims priority to GB Patent Application No. 1804411.5 filed 20 Mar. 2018, the entire contents of each of which are hereby incorporated by reference.

Software to be executed by a data processing apparatus may typically be written in a high-level programming language and then compiled into code according to the instruction set architecture supported by the apparatus on which the software is to be executed. For example, the software may originally be written in a higher level language such as Java, C or C++, and then compiled into a natively supported instruction set architecture such as x86 or Arm®.

Some higher level programming languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;
Use-after-free errors, in which an access to a memory location is made after that memory location has already be deallocated or freed;
Use-after-return, in which a memory access to an address associated with a variable used within a function (such as a value on a stack) is made after already returning from the function;
Use-out-of-scope errors, in which variables are accessed outside of the scope in which they are declared; and
Use-before-initialisation errors, in which a memory address associated with a variable is accessed before the variable has been initialised.

These are just some examples of memory-related errors which can result in unpredictable behaviour and potentially provide avenues for attackers to exploit. Hence, it may be desirable to provide architectural support, within the instruction set architecture supported by a given processing apparatus, for assisting with runtime detection of certain classes of memory errors.

At least some examples provide an apparatus comprising: processing circuitry; memory access circuitry to perform a guard tag check for a tag checking target address having an associated address tag, the guard tag check comprising comparing the address tag with a guard tag stored in a memory system in association with a block of one or more memory locations comprising an addressed location identified by the target address; and an instruction decoder responsive to a random tag setting instruction specifying a tag setting target address, to control the processing circuitry to set the address tag associated with the tag setting target address to a random tag value randomly selected from a set of candidate tag values.

At least some examples provide a method comprising: performing a guard tag check for a tag checking target address having an associated address tag, the guard tag check comprising comparing the address tag with a guard tag stored in a memory system in association with a block of one or more memory locations comprising an addressed location identified by the target address; and in response to decoding of a random tag setting instruction specifying a tag setting target address, setting the address tag associated with the tag setting target address to a random tag value randomly selected from a set of candidate tag values.

At least some examples provide a computer program for controlling a host data processing apparatus to provide an instruction execution environment for execution of instructions of target program code, comprising: memory access program logic to perform a guard tag check for a tag checking target address having an associated address tag, the guard tag check comprising comparing the address tag with a guard tag stored in a memory system in association with a block of one or more memory locations comprising an addressed location identified by the target address; and tag setting program logic responsive to a random tag setting instruction specifying a tag setting target address, to set the address tag associated with the tag setting target address to a random tag value randomly selected from a set of candidate tag values.

A storage medium may store the computer program described above. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus;

Figure 1:
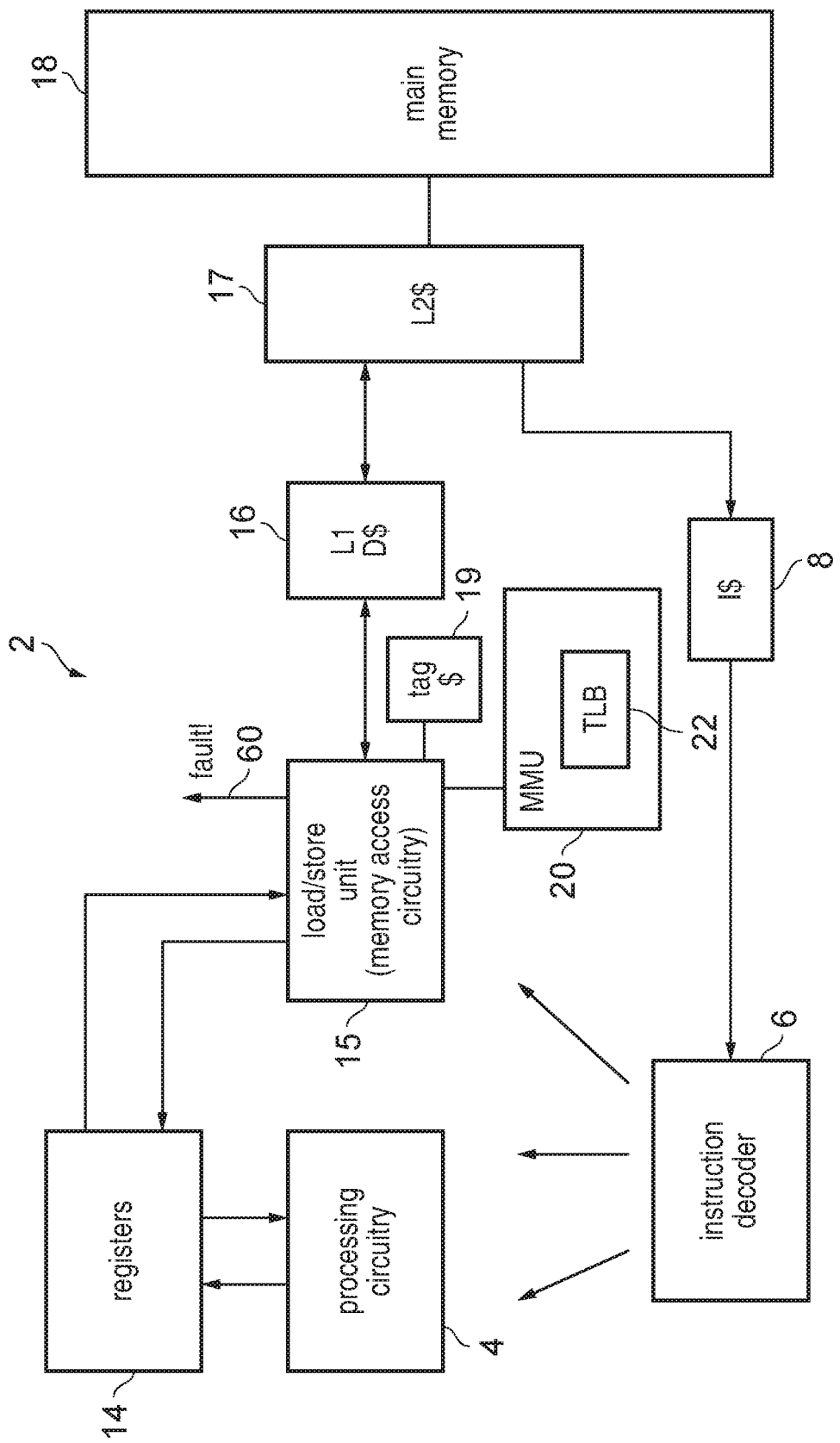

One approach for protecting against certain memory usage errors of the type discussed above may be to provide guard tags which are stored in a memory system in association with blocks of one or more memory locations. When a tag-guarded memory access operation is requested based on a target address identifying a particular addressed location in the memory system, a guard tag check may be performed. In the guard tag check, memory access circuitry may compare an address tag that is associated with the target address with a guard tag that is stored in the memory system in associated with a block of one or more memory locations which includes the addressed location identified by the target address. The memory access circuitry may, in some examples, generate an indication of whether a match is detected between the guard tag and the address tag. This indication can be used to control whether the memory access is allowed to succeed or whether subsequent operations can succeed, or could merely be reported while allowing memory accesses to continue as normal.

This can be useful as, for example, a compiler compiling code based on a memory-unsafe language such as C or C++ can, when initialising regions of memory, set the guard tags of blocks of memory which the code is expected to access to particular values, and may associate the corresponding address tag values with the target addresses pointing to those blocks. If a memory usage error occurs, and for example the address pointer is used out of scope or extends out of the bounds of the valid range which was initialised, then it may be likely that the guard tag associated with the addressed location may not match the address tag associated with the target address, and in this case an error handling response or error reporting mechanism may be triggered. The particular response taken can depend on the particular needs of the software being executed or on the particular micro-architectural implementation of the architecture. Hence, even if the high level language does not have means for performing run time error checks in order to guard against memory access errors, the ISA used for the compiled code may include architectural features for performing such checks.

In the technique discussed below, a data processing apparatus may have an instruction decoder which supports a random tag setting instruction which specifies a tag setting target address. In response to the random tag setting instruction, the instruction decoder controls processing circuitry to set the address tag associated with the tag setting target address to a random tag value which is randomly selected from a set of candidate tag values.

This form of instruction can be useful for a number of reasons. In practice, to limit the storage overhead of storing guard tags for each block of memory locations, the number of bits in each guard tag may be relatively small, for example 4-bits in some implementations. The smaller the number of tag bits, the greater chance of an erroneous memory access passing the guard tag check simply because it happened to match against a block of memory which has the same guard tag value even though it was not intended to access that block of memory. For example, with a 4-bit guard tag there is a 1 in 16 chance of accidentally matching against a guard tag for a region of memory which really should be flagged as an erroneous access for a given address.

By providing an instruction for setting the address tag associated with a given target address to a random tag value which is randomly selected from a set of candidate tag values, this means that if a class of devices each executes the same code, they may allocate different random tag values for the same address. Firstly, this can improve error detection since even if one device in the class happens to select a tag value which matches against a region of memory which is incorrectly accessed, other devices in the class would have selected different values as the random tag value and so can detect a guard tag mismatch, and report the error. Hence, by crowdsourcing error reports from a class of devices, it is likely that at least some devices in the class may detect the error due to the spread of randomly selected values used for addresses at a given part of the program code. Hence, the use of a random tag setting instruction can improve the probability of memory-related errors being detected in a population of devices.

Also, by randomly selecting the value to allocate to the address tag, this makes it much harder for an attacker to successfully mount an attack which is usable against a large population of devices. Even if the attacker happens to be able to guess the correct tag value on one device, as other devices use different randomly selected tag values for the memory accesses at the same point of the program, the attacker's successful attack may not work on other devices. This is particular useful as, in practice, in order to mount a useful attack, the attacker may not merely need to be able to guess the guard tag of a single memory access, but may need to string together several successful guesses in a row in order to be able to make the program perform some undesirable operation or provide effects not intended by the author of the program code. Hence, if each of a series of memory allocations have the corresponding address tags set to random values then the number of permutations of different patterns of tag values allocated for each of the successive allocations increases, so that the overall device population is divided into many smaller sub populations each with a different combination of random tag values for a given set of memory allocations, making an attack much more difficult and confining any successful attack to a smaller subset of the population of devices.

It will be appreciated that the random tag setting instruction need not be the only way of setting address tags associated with given target address. The instruction decoder could also support a tag setting instruction which allows the address tag associated with a target address to be set to a certain software-defined value which is provided by the software itself and is deterministic (i.e. the same across all devices executing the same program), rather than being randomly selected by the hardware in a non-deterministic way as for the random tag setting instruction. This gives software developers the choice of whether to use the random tag setting instruction or the fixed value tag setting instruction as preferred.

In some examples of the random tag setting instruction, the random tag value could be randomly selected from the entire set of candidate tag values. For example an N-bit tag value can have $2^N$ different values and so the random tag value could be randomly selected from any of those $2^N$ values.

However, in response to one variant of the random tag setting instruction, the instruction decoder may control a processing circuitry to prevent at least one excluded value of the set of candidate tag values from being selected as the random tag value, and to randomly select the random tag value from a remaining subset of the candidate tag values. The ability to exclude certain values from being selected as the random tag value, but then to randomly select the random tag value from the remaining subset, can be useful for a number of reasons. Firstly, some tag values could be reserved for special purposes. For example, one tag value of the candidate set could be reserved as a "match all" value which is considered to match against any other tag value (e.g. this could be useful for effectively disabling guard tag checks for addresses of certain memory accesses with lower security requirements). When setting the address tag for an address for which the "match all" behaviour would be inappropriate, it may therefore be desirable to exclude the "match all" value from the subset of candidate tag values which can be selected as the random tag value. Other special tag values could also be assigned. Hence in some cases the at least one excluded tag value could include one or more hardware-defined excluded tag values, which are fixed by hardware. In another example, the set of at least one excluded tag value could include one or more excluded tag values identified by configuration data stored in a configuration register. For example some functionality of the device may be optional and the configuration register may specify whether such functionality is enabled. Depending on which features are enabled then certain tag values may need to be excluded. For example the configuration register could define whether the "match all" functionality discussed above is enabled or disabled so as to select whether the corresponding match all value is excluded from selection. The configuration register may be a register which is not specified by the random tag setting instruction itself, e.g. a status register or other control register provided by the architecture of the processing apparatus.

In other examples, it may be desirable to allow software to specify certain values of the set of candidate tag values which are excluded from being selected as the random tag value. For example, the at least one excluded tag value may include one or more excluded tag values identified by at least one register specified by the random tag setting instruction. Also, it may be possible to provide a variant of the random tag setting instruction which specifies an excluded tag value as an immediate value directly indicated by the instruction encoding of the random tag setting instruction. Another approach can be for the random tag setting instruction to specify a source register or a destination register (or both) which contains an address having a corresponding address tag, and the tag value of the address tag of that address may be extracted and determined to be one of the at least one excluded tag value.

Regardless of which approach is used to allow the software to indicate which value should be excluded, the ability to exclude certain software-defined values from being selected can be useful because it may be desirable for software to ensure that successive allocations of blocks of memory use different tag values, so that if a memory access which really should target one region of memory spills over into a next region associated with a different tag allocation, then the different guard tags would allow that bounds violation to be detected. Hence, if allocating memory on a heap or other data structure in which a region of memory is allocated between two existing allocations, the software may wish to ensure that the guard tag set for the new allocation is different to both the guard tag associated with the preceding allocation and the guard tag associated with the subsequent allocation. Another example may be when allocating a region on a stack data structure where it may be desirable to exclude the value of the tags assigned to an address the previous time a stack allocation was made.

Some examples may permit only one of these ways of identifying an excluded value. Others may support a combination of these techniques, e.g. the instruction may specify some software-defined excluded tag values, but also some hardware-defined values could be permanently excluded or such hardware defined tag values could be selectively excluded depending on information specified by a configuration register.

In cases where at least some of the at least one excluded tag value are identified by a register of the random tag setting instructions, then this information can be represented in different ways within that register. In general, the random tag setting instruction may specify at least one source register storing random selection state information.

In one example the random selection state information may comprise a bitfield comprising a number of bits corresponding to at least a subset of the set of candidate tag values, with each bit of the bitfield indicating whether the corresponding candidate tag value is one of the set of at least one excluded tag value. The bits of the bitfield may be set by previous instructions of the software being executed.

Although it is possible for the software in some cases to directly determine the values of the respective bits of the bitfield depending on which values are to be excluded, if it is desirable to exclude certain values used by previously assigned address tags (which may have been themselves determined through a random selection, rather than a deterministic selection by software), then the software may not know in advance which values should be excluded. Hence it can be useful for the instruction decoder to also support a tag value excluding instruction which specifies a tag excluding target address and a destination register for storing the bitfield of the random selection state information. In response to the tag value excluding instruction, the instruction decoder may control the processing circuitry to update a bit of the bitfield, which corresponds to the address tag associated with the tag excluding target address, to indicate that the corresponding tag value is one of the set of at least one excluded tag value. This allows a programmer/compiler to include one of more instances of the tag value excluding instruction specifying, as the tag excluding target address, any addresses whose tag value should be excluded from the subsequent random selection. This causes the respective bits of the bitfield corresponding to the values to be excluded to be populated, and then a subsequent random tag setting instruction may then use the bitfield to control the random selection of the address tag to set for a different address specified as the tag setting address.

In some examples the bitfield of the random selection state information could include bits corresponding to the entire set of tag values.

However in other cases the bitfield could only include bits for a proper subset of the candidate tag values. For example, if certain candidate tag values are hardware-defined as permanently excluded, then there may be no need to provide bits for those candidate tag values.

Another reason why the bitfield may not comprise bits for all possible candidate tag values may be that the selection of a certain proper subset of candidate tag values from among the overall candidate set may already have been made by an earlier instruction and the random selection state information may then comprise of tag values selected as that proper subset of candidate tag values. The tag values of the proper subset of candidate tag values may be specified in either the same register as the bitfield indicating which values are excluded, or in a different register. However it can be useful to specify both the tag values and the bitfield in the same register in order to reduce the number of register reads required by the random tag setting instruction. With this implementation the instruction decoder may support a random tag selecting instruction which specifies a destination register for storing the tag values of the random selection state information. In response to the random tag selecting instruction, the instruction decoder may control the processing circuitry to randomly select the proper subset of candidate tag values from among the set of candidate tag values (e.g. without considering whether any values are excluded) and write the tag values of the selected proper subset of candidate tag values to the destination register which stores the random selection state information.

With this approach, the overall operation to select a random tag value while excluding certain excluded values can be split into a number of separate instructions, which can simplify the hardware implementation. For example, the operation may be implemented using an instance of the random tag selecting instruction, then one or more instances of the tag value excluding instruction described above (for extracting tag values from corresponding addresses and updating the bitfield of the random selection state to indicate these values are excluded), and then random tag setting instruction which selects one of the proper subset of candidate tag values which is not excluded. For example, if the random selection state information indicates T candidate tag values as the proper subset of tag values, this approach would permit a maximum of T−1 candidate values to be excluded, so that there is always at least one of the proper subset of candidate tag values remaining which can still be selected as the random tag value by the random tag setting instruction. This approach simplifies the hardware implementation, making it simpler to meet timing requirements, because the random tag selecting instruction may make a selection of T values based on a random source without needing to consider whether any values are excluded, while the random tag setting instruction and tag value exclusion instruction may be implemented using simple logical operations and/or multiplexers for selection, without needing to consider a random number source. Also, this approach can limit the number of source registers required per instruction, which may be useful as generally the number of register read ports may be limited in a typical microprocessor design.

Nevertheless, other approaches may provide a hardware implementation which supports both the selection based on a random number source and the exclusion of some values being performed in response to the same instruction. In this case, there is a challenge in implementing the instruction in a hardware-efficient way while still ensuring an even probability distribution of selecting each of the remaining candidate values other than the at least one excluded value.

In one approach for a hardware implementation, which supports exclusion of a maximum of N excluded tag values, the instruction decoder may control the processing circuitry to:
   randomly select at least N+1 tag values of the set of candidate tag values;
   compare each of the selected tag values against each excluded tag value; and
   select one of the selected tag values which mismatches against all of the at least one excluded tag values as the random tag value to set to the address tag associated the tag setting target address.
For example, the selection of the N+1 random values may be implemented using a look up table (LUT) defining a certain pseudo random sequence of values, and a linear feedback shift register (LFSR) or other circuit providing a random seed selection value which can be used to select which portion of the sequence provided by the LUT is extracted and used as the N+1 tag values. The comparison and selection steps can be implemented using comparators, logic gates and multiplexers in order to select one of the N+1 tag values which is not excluded.

An alternative approach for implementing the hardware while performing the overall selecting/excluding operation in a single random tag setting instruction is to allow a maximum of two values to be excluded from the random selection: a predetermined excluded tag value (which may be fixed in hardware or configurable based on a configuration register, but which is selected independently of the instruction encoding of the random tag setting instruction), and an additional excluded tag value specified by the random tag setting instruction. In this case, in response to the random tag setting instruction, the instruction decoder may control the processing circuitry to:
   randomly select one of the set of candidate tag values as a selected tag value;
   perform a comparison of the additional excluded tag value against an intermediate value which is one of:
      the selected tag value, when the selected tag value mismatches both the predetermined excluded tag value and a further predetermined tag value of the set of candidate tag values; and
      a value obtained by inverting a randomly selected bit of the selected tag value, when the selected tag value matches one of the predetermined tag value and the further tag value;
   when the comparison detects a mismatch between the additional excluded tag value and the intermediate value, output the intermediate value as the random tag value to set to the address tag associated with the tag setting target address; and
   when the comparison detects a match between the additional excluded tag value and the intermediate value, output the further predetermined tag value as the random tag value to set to the address tag associated with the tag setting target address.
Similar to the predetermined excluded tag value, the further predetermined tag value may be hardwired (fixed) in hardware, or configurable specified by a control register, independent of the random tag setting instruction encoding.

Hence, by selecting a random value, and outputting an intermediate value which either matches the selected value, or has a randomly selected bit inverted if the selected value matches one of the predetermined excluded tag value or further predetermined tag value, the intermediate value can never match either the predetermined excluded tag value or the further predetermined tag value, but can take any other value. The intermediate value can then be compared against the additional (software-specified) excluded tag value, and if there is a match in this comparison, the further predetermined tag value can be substituted for the intermediate value to provide the final output random tag value, and otherwise the intermediate value itself can be used as the output random tag value. This approach can help to limit the hardware complexity as only a single random value needs to be selected based on the random number source and compared against an excluded value, which limits the number of comparators and the complexity of the selecting (multiplexing) circuitry, while still achieving a relatively even probability distribution in selecting between the non-excluded values.

Although the predetermined excluded tag value and the further predetermined tag value could be any two members of the overall set of candidate tag values, it can be particularly useful for one of the predetermined excluded tag value and the further predetermined tag value to be a value having all bits equal to 0 and the other to be a value having all bits equal to 1 (either way round), as this may map to likely usage of "special" tag values not to be selected as the random tag value, e.g. the "match all" value. In some implementations, the values defined as the predetermined excluded tag value and further predetermined tag value could be hardwired (permanently fixed), or alternatively they could be defined by a status value in a configuration register (e.g. a value selecting which of the "all 0" and "all 1" values is the excluded value).

Hence, from the above it will be appreciated that there are a range of different ways in which the actual hardware of the processing circuitry can implement a random selection from a set of candidate values while excluding at least one excluded value from the selection. This can be done either in response to a single instruction or in response to a sequence of instructions. The architectural advantages of the random tag setting instruction (of increased error detection probability and robustness against attack discussed above) can be achieved regardless of the specific hardware implementation chosen at a micro-architectural level.

The random selection from the set of candidate tag values (or the set of candidate tag values excluding the at least one excluded value) can be made based on a true random value or a pseudo random value. Hence it will be appreciated that providing a true random number generator is not essential for the technique discussed above. In some cases the random selection may be based on a pseudo random number generator. For example the random selection could be based on a value extracted from a linear feedback shift register.

In practice, having allocated a given random value to the address tag associated with a given address, it may often be desirable to also store the same random tag value to the guard tag of a block of memory locations comprising an addressed location identified by that address. In some implementations, this may be done by a separate instruction from the random tag setting instruction. For example a subsequent guard tag setting instruction could take the tag setting target address for which the address tag has previously been set by the random tag setting instruction, and use the random tag value of that address as the value to write to the corresponding guard tag of the corresponding block of memory locations.

However in other implementations it may be possible to provide a combined address tag and guard tag setting instruction which both randomly updates the address tag associated with the tag setting target address, and also controls the memory access circuitry to update, to the random tag value, the guard tag stored in the memory system in association with the block of memory locations comprising the addressed location identified by the tag setting target address. This can avoid the need to execute a second instruction and hence reduce code density.

In the guard tag check, when a mismatch is detected between the address tag and the guard tag for a given memory access, this could be reported by returning some form of fault status indication. The particular form of the generated indication of whether a match is detected between the guard tag and the address tag may vary from implementation to implementation. In some cases, the tag-guarded memory access operation may comprise controlling whether a memory access to the addressed location is allowed depending on whether the match is detected between the guard tag and the address tag. However, in other examples a memory access which triggered the guard tag check may be carried out irrespective of whether a match is detected between the guard tag and the address tag. For example, the guard tag associated with a given block of memory locations may be stored in a different block of memory locations within the memory system and so accessing the guard tag may require a separate read operation. Therefore, it may delay processing of the actual memory access if the memory access is delayed until the guard tag and the address tag have been compared, so it may be desired to perform the memory access to the addressed location before the guard tag is available, and regardless of whether any match is detected between the guard tag and the address tag, and then to generate a separate indication of whether a match is detected once the guard tag has been obtained and compared with the address tag.

In one example the indication of whether a match is detected may be a signal representing a fault condition, which is generated when a mismatch is detected between the guard tag and the address tag. For example, the memory access circuitry may signal a similar memory fault to faults generated if access permissions are violated or if unmapped addresses are accessed, or a different kind of fault condition could be indicated. The fault signal could trigger the processing circuitry to execute an exception handling routine for responding to the detected fault.

Alternatively, when the guard tag mismatches the address tag for a given memory access, a status indication may be recorded within a control register accessible to the processing circuitry of the apparatus, to indicate whether a match or mismatch was detected in the comparison of the guard tag and the address tag. The status information could then be read by subsequent instructions to check whether the memory access was valid.

Another option for reporting whether the address tag and guard tag matched or mismatched in the guard tag check can be to record information in an error log associated with the executed piece of code, which tracks any guard tag errors detected throughout the piece of code. For example, in response to a mismatching guard tag and address tag, the target address which triggered the mismatch, or the instruction address of the instruction which triggered the mismatching memory access, could be recorded in the error log. In this case, rather than performing any specific action to impede the operation of the code, the errors could simply be recorded in the error log. The error log could then be made available to a software provider of the code to assist the provider with eliminating errors in subsequent versions of the software.

Hence, it will be appreciated that there are a range of ways in which a guard tag match/mismatch indication could be generated by the memory access circuitry when the guard tag check is performed.

In some embodiments, the blocks of memory locations which have corresponding guard tags may each comprise a single memory location. In this case, each individual memory location may have a different guard tag, which can provide fine granularity of setting the guard tags so that a greater range of memory errors can be detected.

However, in practise the overhead of setting individual guard tags for each addressed location may be too high, and it can be more efficient to associate each guard tag with a block of multiple memory locations. In this case several adjacent memory locations may share the same guard tag, which can be enough for detecting common forms of memory-related error.

The guard tag which is associated with a given block of memory locations can be stored at any other memory location within the memory system. The particular way in which the location of the guard tags in the memory system is selected may vary significantly from implementation to implementation or at run time. In some examples, the location storing the guard tags could be architecturally accessible by the processing circuitry, e.g. the guard tag storage location may be a location mapped to part of the same address space as the addressed location. In this case, the mapping between the addressed location itself and the address of the corresponding tag storage location could be fixed or hardwired, or could be variable, e.g. tracked in a tracking table maintained by the memory access circuitry or in a translation lookaside buffer. Alternatively, other implementations may store the guard tag associated with a given addressed location in a further storage location which is not architecturally accessible to the processing circuitry, e.g. in additional storage provided in the micro-architecture which is not mapped to the address space which can be addressed by instructions executed by the processing circuitry. In this case, the memory access circuitry may determine, based on the address of the addressed location, the particular internal address used to refer to the corresponding tag storage location, and trigger any additional memory access needed to read the tag data from the tag storage location. Regardless of whether or not the tag storage location is architecturally accessible to the processing circuitry, tag values could also be cached within a cache for faster access, either within the same cache used for data values, or in a dedicated tag cache.

In some cases, the guard tags may be relatively small, for example 4 or 8 bits, and so multiple guard tags each associated with a different block of memory locations may fit within the same memory location.

The address tag can be associated with the target address in different ways. In some cases the address tag could be specified separately from the target address, e.g. using a separate register specified by the memory access instruction which triggers the memory access operation and guard tag check. However, in other examples the address tag may be determined as a function of one or more selected bits of the target address. That is, the address tag may comprise information derived from a portion of the target address itself. Often, while an instruction set architecture may support addresses with a certain number of bits (e.g. 64 bits), a given hardware device may not in practice need so much memory capacity that it would use all the possible addresses which can be represented using that number of bits. For example, with current trends in device usage there is not yet any need to provide $2^{64}$ individual addressable locations. Therefore, often some bits of the memory addresses may effectively be unused and may either always have the same value, or be set as a sign extension of the most significant "real" address bit (so that the unused portion is set to all 0s or all 1s). This unused portion can therefore be reused to represent the address tag or a value for deriving the address tag, to avoid needing to access a separate register in order to obtain the address tag, and also to make it easier to track the correspondence between the addresses and the corresponding address tags as the address tag may by definition be transported along with the address whenever the address is manipulated or moves between registers.

In embodiments which use a portion of the target address to determine the address tag, note that this address tag is different to a tag portion of the target address which may be used by caches to determine whether the information from the addressed location identified by the target address is stored within the cache. Many caching schemes may store a tag portion of the address of a cached piece of data alongside that data within the cache, so that on searching the cache for a given address, part of the address can be compared with the tags stored alongside the cached data in order to determine whether the cached data actually corresponds to the required address. However, in this case the tag portion of the address, which is compared with the tag in the cache, would be part of the portion of the address which actually identifies the particular addressed location for which the data is required, i.e. changing the cache tag portion of an address would by definition result in the address pointing to a different addressed location within the memory system. In contrast, with the address tag used for the tag-guarded memory operation, the memory access circuitry may select the addressed location for which data is required independent of the address tag. That is, even if the address tag has different values, the addressed location referenced by the target address may still be the same, as the selection of the addressed location may depend only on other portions of the target address. This gives the freedom for compilers to set the address tags associated with particular addresses to any value (e.g. the randomly selected values discussed above) to match the corresponding guard tag values which have been allocated to the relevant blocks of data in the memory system.

Where the address tag is represented using a subset of bits of the address, in some implementations the randomly selected value (excluding any excluded values) which is selected in response to the random tag setting instruction may be transformed based on at least one other bit of the address, in order to determine the value to be written to the subset of bits of the tag setting target address. This can be useful as for compatibility with legacy allocations of address space, the "special values" of the tag values to be interpreted in special ways (e.g. for "match all" behaviour) may need to have different values for different portions of the address space. For example, as addresses may be sign extended, it may be expected that the top unused bits may all be 1 if the top "real" (meaningful) bit of the address which is actually used for selection of the addressed memory location is 1, while the top unused bits are set to 0 if the top "real" bit is 0. To ensure legacy code which has allocated these unused bits in this matter (and has not been written to use the guard tag functionality) continues to function correctly, the "match all" value could therefore be "all 1" for addresses where the top "real" bit is 1, and "all 0" for addresses where the top "real" bit is 0. This can be achieved by specifying one of "all 0" and "all 1" as the excluded value, making a random selection from the remaining values of the candidate set (possibly also excluding other excluded values), and then determining based on the most significant "real" bit of the address whether to transform the selected value (e.g. by inverting all the bits), in order to determine the value to be written to the tag portion of the address, so that regardless of whether the top "real" bit is 1 or 0 the excluded value will map to the correct "match all" value. It will be appreciated that other transformations of the randomly selected value based on one or more bits of the address could also be applied, not just inverting bits.

In some implementations, the instruction decoder could trigger the guard tag check in response to all memory access instructions. Alternatively, the instruction decoder could support separate non-tag-guarded and tag-guarded variants of memory access instructions. In this case, the guard tag check could be triggered in response to the tag-guarded variant of the memory access instruction. In contrast non-tag-guarded memory access instructions could simply trigger an access to the addressed location identified by the target address specified by that instruction, without performing the guard tag check. Hence, it is not essential to perform the guard tag check in response to all memory access instructions. In some cases, an instruction for triggering the guard tag check (without any corresponding memory access to the location identified by the tag checking target address) could also be supported.

However, even if all memory access instructions are interpreted as tag-guarded memory access instructions, there may still be other ways in which the instruction set architecture may support selectively disabling the guard tag check for certain operations. For example, a control parameter within a control register of the processing apparatus could selectively disable tag comparisons. As discussed above, another option is for a certain value of the address tag to be interpreted in a special manner so that they indicate that the address tag should be considered to match against any possible value of the guard tag, again effectively disabling the effects of the tag comparison so that no error is reported regardless of whether the address tag matches the guard tag.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes a memory access unit (or load/store unit) 15 for controlling transfer of data between the registers 14 and the memory system. In this example, the memory system includes the instruction cache 8, a level 1 data cache 16, a level 2 cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page table stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page.

Figure 2:
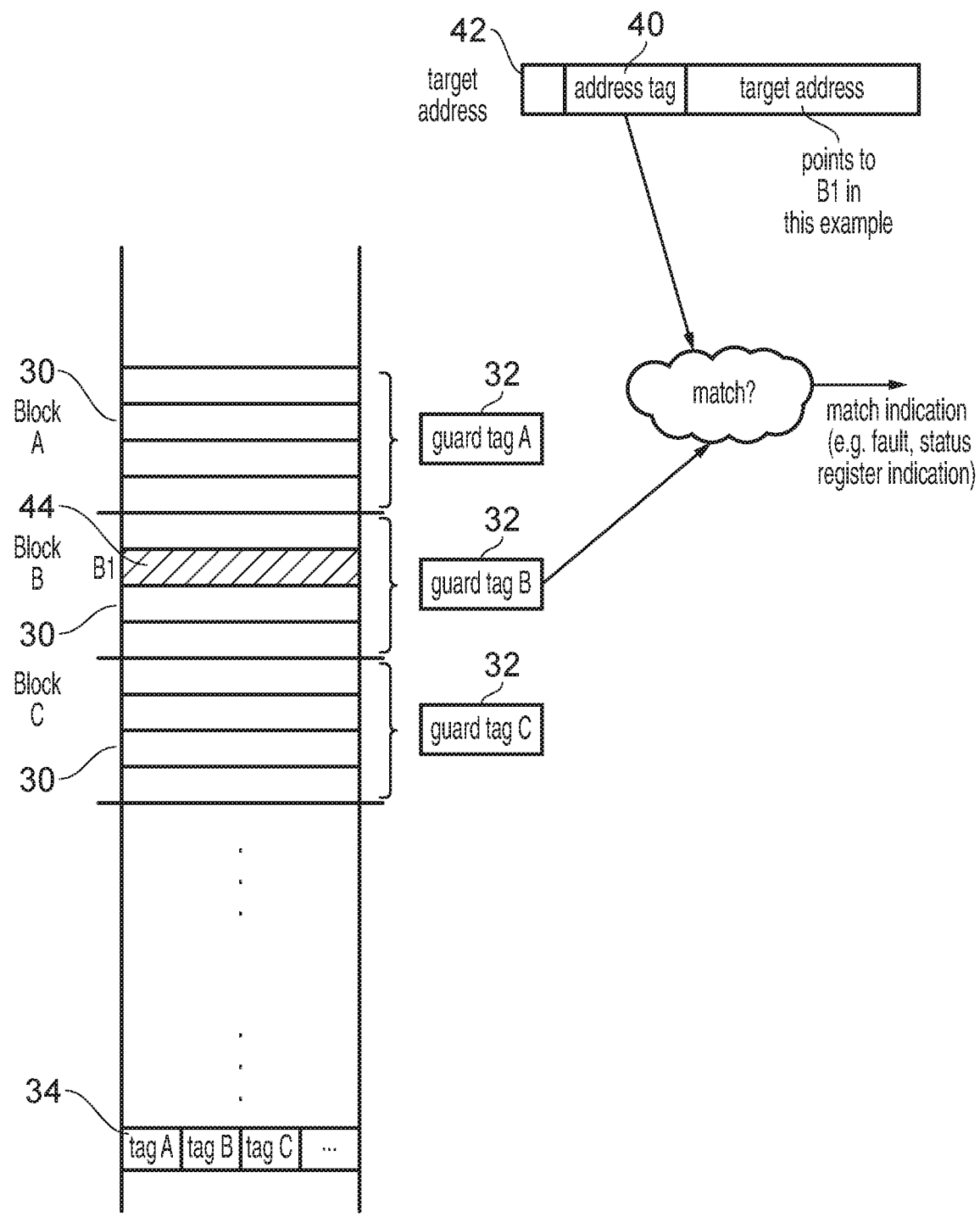
FIG. 2 shows an example of a tag-guarded memory access operation comprising checking whether an address tag matches a guard tag.

FIG. 2 schematically illustrates a concept of tag-guarded memory accesses. The physical address space used to refer to memory locations within the memory system may be logically partitioned into a number of blocks 30 each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the physical address space, or within additional storage locations provided in main memory 18 which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 could be provided in the micro architecture for caching tag values from the non-architecturally accessible storage, for faster access than if the tags had to be accessed from main memory 18. The particular mapping of which tag storage locations 34 correspond to each block 30 may be controlled by the load/store unit 15 and could be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence by associating the guard tag 32 with physical memory locations this can improve performance. In general it is a choice for the particular micro architectural implementation exactly how the guard tags 32 are associated with the corresponding blocks 30 of the physical address space. In general, all that is required is that the guard tag 32 associated with a given block of memory can be accessed and compared.

Hence, when a tag-guarded memory access is required, an address tag 40 (which is associated with the target address 42 identifying the addressed location 44 to be accessed), is compared against the guard tag 32 which is associated with the block of memory locations 30 which includes the addressed location 44. For example, in FIG. 2 the target address 42 points to a certain location B1 in memory, marked 44 in the address space of FIG. 2. Therefore the guard tag B which is associated with the block of locations B including location B1 is compared against the address tag 40 associated with a target address 42. As shown in the top of FIG. 2, the address tag 4 may be determined as a function of selected bits of the target address itself. In particular, the address tag may be determined from bits within a portion of the target address which is unused for indicating the specific memory location which is to be selected as the addressed location 44. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler, or can be randomly selected as discussed below, for example. The address tag and guard tag 32 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, the load/store unit 15 compares the address tag 40 and the guard tag 32 associated with a block 30 including the addressed location 44, and determines whether they match. The load/store unit 15 generates a match indication indicating whether the address tag 40 and the guard tag 32 matched. For example, this match indication could be a fault signal 60 which is generated if there is a mismatch between the address tag 40 and the guard tag 32, or an indication placed in a status register indicating whether there was a match, or an entry added to an error report to indicate the address for which the error was detected and/or the instruction address of the instruction which triggered the error.

Figure 3:
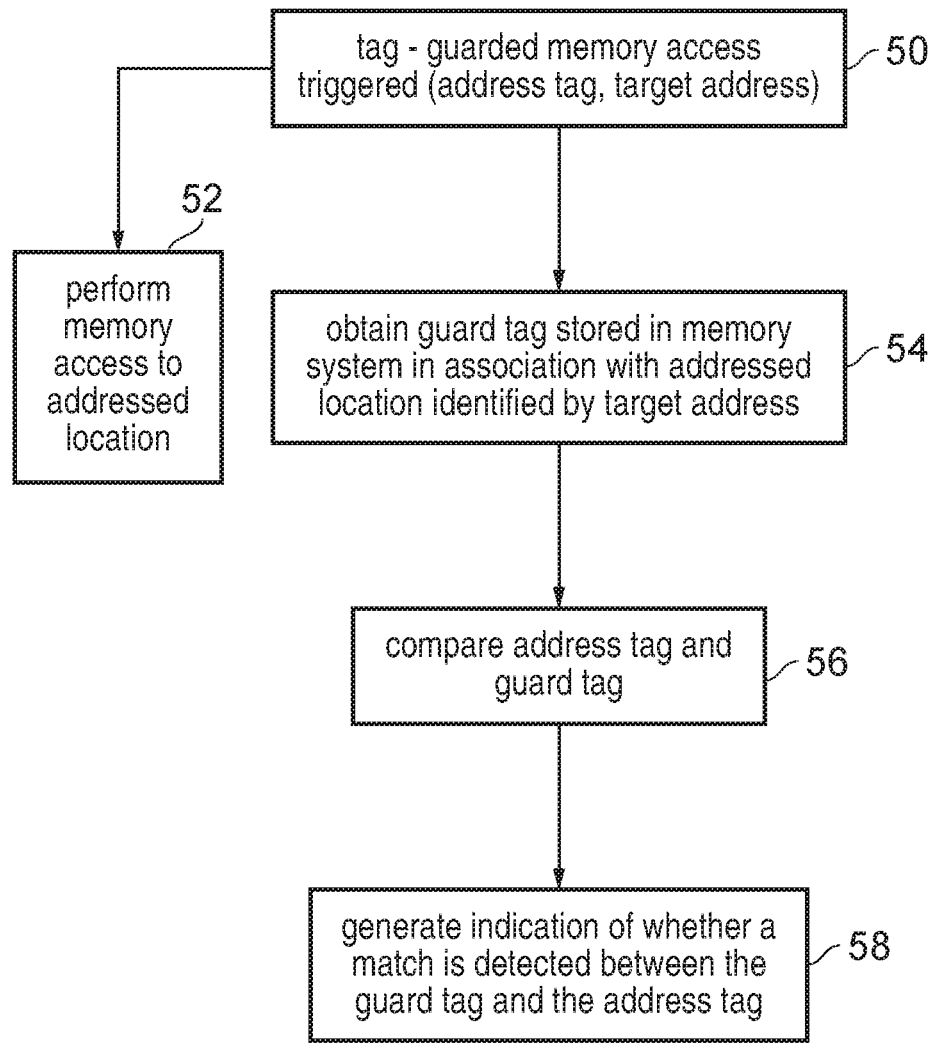
FIG. 3 is a flow diagram showing a method of performing a tag-guarded memory access operation.

FIG. 3 shows a flow diagram for handling a tag guarded memory access. The instruction triggering the memory access may specify an address tag and a target address. As shown in FIG. 2, in some cases the address tag may actually be derived from a subset of bits of the target address itself, although in other examples it could be specified in a separate register. At step 50, the instruction triggering the tag guarded memory accesses is encountered. In response, at step 52 the memory access circuitry 15 triggers a memory access to the addressed location 44 identified by the target address. Also, at step 54 the memory access circuitry 15 obtains the guard tag 32 which is stored in the memory system in association with the block of memory locations 30 that includes the addressed location 44 identified by the target address. At step 56 the memory access circuitry 15 compares the address tag 40 with the guard tag 32 obtained at step 54. At step 58 an indication of whether a match is detected between the guard tag and the address tag is generated by the memory access circuitry 15 (e.g. any of the types of match/mismatch reporting indication described above). The precise indication used to report any mismatch may vary from implementation to implementation.

Figure 4:
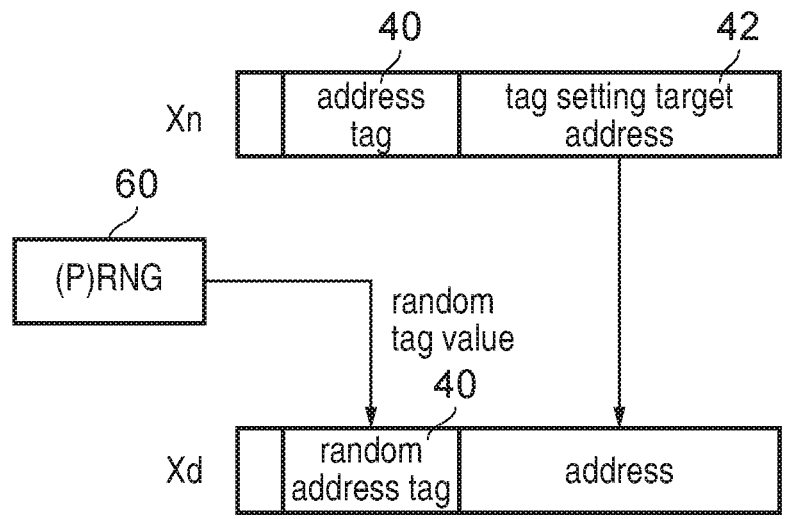
FIG. 4 shows a first example of a random tag setting instruction.

FIG. 4 shows a first example of a random tag setting instruction which specifies a single source register Xn and a destination register Xd. The source register Xn specifies a tag setting target address 42 which may already be associated with a certain address tag value 40 (or could have the tag bits by default set to a sign extension of the address 42). The instruction decoder 6 responds to this instruction by controlling processing circuitry 4 to write the tag setting target address 42 to a corresponding portion of the destination register Xd and to set the address tag 40 in the destination register to a random tag value selected based on a random number generator or pseudo random number generator 60. Any known design of random or pseudo random number generator can be used. With this approach no values are excluded from selection as the random tag value. Setting the address tag of a given address to a randomly selected value is useful for increasing the variation in tag values which are used by a number of different devices executing the same program, to increase the chance that a memory related error will be reported by at least some of the devices, and to reduce vulnerability to attacks since it becomes harder for an attacker to mount a successful attack which could affect a significant fraction of a population of devices. In some cases, as well as setting the address tag value 40 in the destination register, a variant of the instruction could also trigger a memory access to memory to set the guard tag 32 associated with the block 30 of memory locations identified by the tag setting target address 42 to the same random tag value as selected for the address tag.

Figure 5:
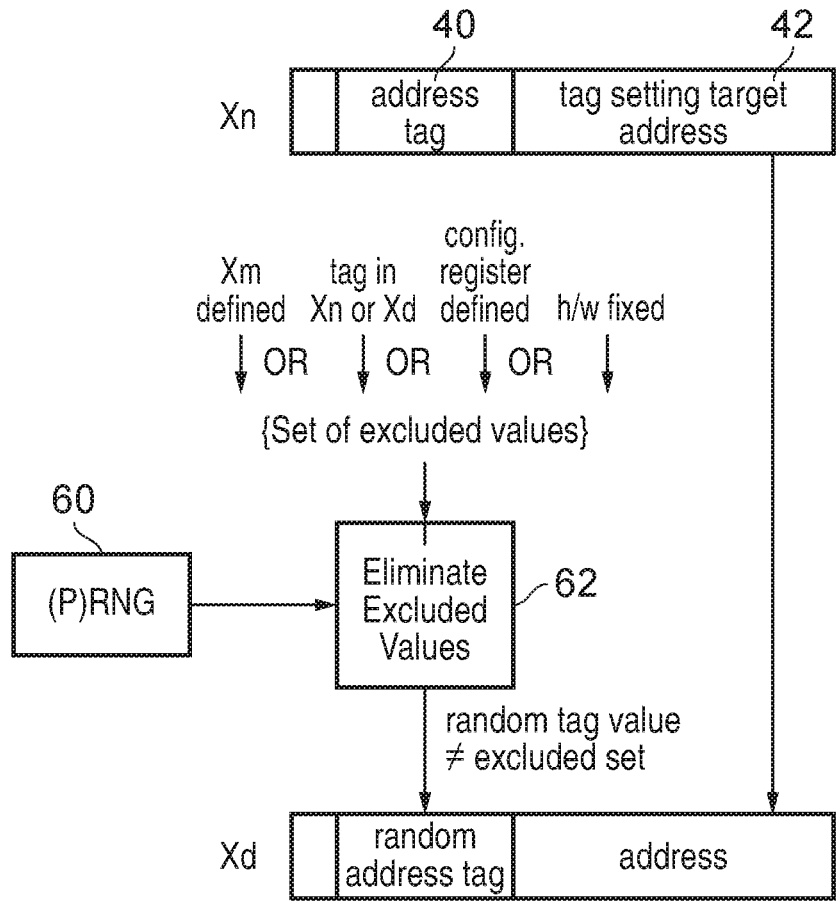
FIG. 5 shows a second example of a random tag setting instruction in which at least one excluded value of a set of candidate tag values is prevented from being selected as the random tag value to be assigned to the address tag of a given address.

FIG. 5 shows a second example of the random tag setting instruction which permits certain excluded values to be eliminated from selection as the random tag value. The random tag setting instruction again specifies a source register Xn and destination register Xd which are the same as in FIG. 4. Optionally, the random tag setting instruction may also specify a second source register Xm which may define state information which may indicate one or more of the set of excluded values. The excluded values can also be identified in other ways independent of Xm. For example if the destination register Xd already includes an address prior to executing instruction, the previous tag associated with that address could be extracted and used as one of the excluded values. Similarly, the address tag value 40 in the source register Xn could also be excluded. Another option can be that the registers 14 of the processing apparatus 2 may include a configuration register which may define configuration state which indicates whether certain values are excluded. Also, certain values could be permanently excluded by hardware, for example hardwired to be excluded. This could be useful if, for example, certain values are permanently assigned for special purposes (e.g. match all) so that they are not allowed to be selected as tag value by the random selecting instruction. Any combination of these techniques may be used to define the set of excluded values.

Hence, with the example of FIG. 5, in response to the random tag setting instruction the instruction decoder 6 again controls the processing circuitry 4 to make a random selection of the random tag value to be written to the tag portion of the destination register Xd, however in this case some additional circuitry 62 may be provided to eliminate the set of excluded values (which may include zero, one or more excluded values) from being selected as the random tag value. A number of examples for implementing this elimination of excluded values are discussed below.

Figure 6:
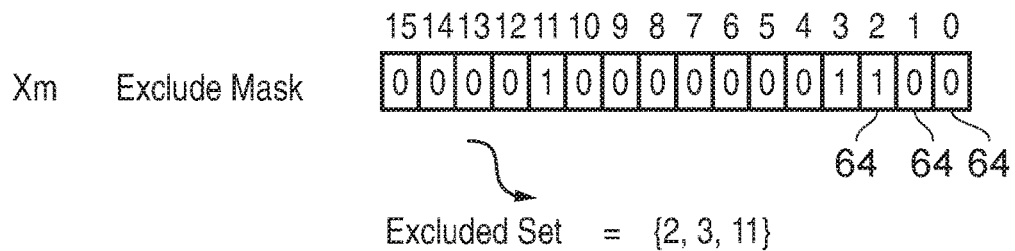
FIG. 6 shows a first example of random selection state information for indicating at least some of the excluded values.

FIG. 6 shows a first example in which the register Xm, which defines the random selection state indicating the excluded values, is implemented as an exclusion mask which includes a bitfield comprising a number of bits 64 each corresponding to one of the possible candidate values of the set of values available for selection by the (pseudo) random number generator 60. For example, in FIG. 6 the bits associated with tag values 2, 3 and 11 are set to indicate that these values cannot be selected as the random tag value by the random tag setting instruction.

Figure 7:
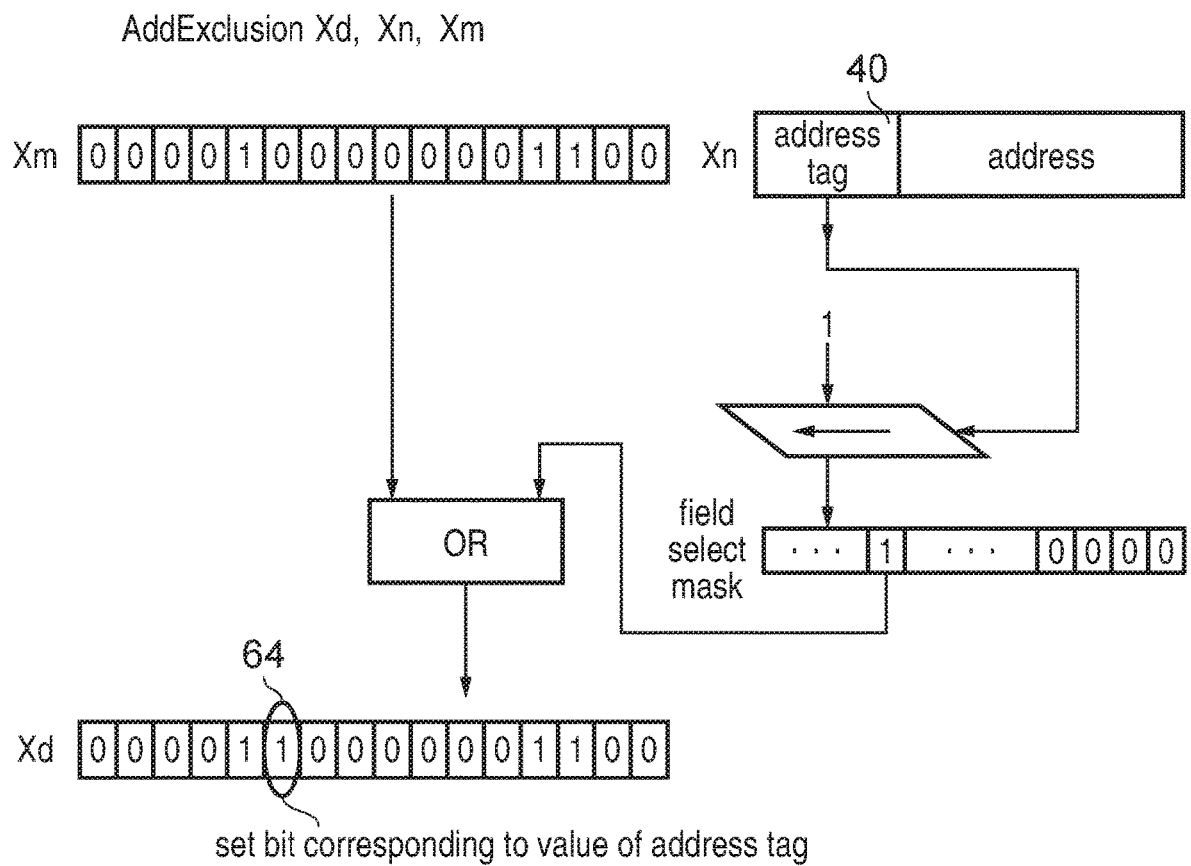
FIG. 7 shows an example of a tag value excluding instruction for updating a bit of a bitfield in the random selection state information to indicate that a tag value extracted from the address tag of an input address is to be excluded from a subsequent selection of a random tag value.

As shown in FIG. 7, the instruction decoder 6 may support an AddExclusion (tag value excluding) instruction which specifies two source registers Xn, Xm and a destination register Xd. One of the source registers Xm specifies an input value of the exclusion mask shown in FIG. 6 which may already have some bits set to 1 to indicate that some values are already excluded, or could be all 0 if no values have yet been excluded. The second source register Xn specifies an address which has a given address tag 40 associated with it. In response to the instruction, the instruction decoder 6 controls the processing circuitry 4 to extract the value of the address tag 40 from the address register Xn, and set the bit 64 of the exclusion mask which corresponds to that extracted address value, so that the value of the extracted address will be excluded from a subsequent random selection of a random tag value based on the random selection state information in Xm. For example, the operation performed in response to the AddExclusion instruction can be implemented by left shifting a value comprising a least significant bit of 1 and all other bits equal to 0, by a number of bit positions indicated by the extracted address tag 40. The shifted value may then be ORed with the input mask in register Xn. It will be appreciated that the shift and OR functions shown in FIG. 7 are just one example of how the hardware could implement the operation and in general any operation, which results in the bit 64 which corresponds to the value of the address tag 40 in source register Xn being set can be used.

Based on the form of the random selection state information shown in FIG. 6, the random tag setting instruction of FIG. 5 can therefore select a random tag value which is not one of the excluded values whose bits 64 of the bitfield in register Xn are set to 1.

An alternative to using such bitfields could be instead to provide a source register Xm which provides a series of fields explicitly defining binary values to be excluded from the selection. For example if a maximum of N values can be excluded and each tag value has a certain number of bits, e.g. 4, then 4N bits of a register could specify the values to be excluded.

Regardless of exactly how the values to be excluded are specified, the hardware may then take the excluded values and compare them against values output by a random number generator or pseudo random number generator 60 in order to ensure that the selected value is not one of the excluded values. However for performance reasons it may be desirable to provide a technique which can select the random tag value from the non-excluded set of values without needing to repeatedly generate different random numbers sequentially and repeatedly test against the excluded values until a non-excluded value is found. It may also be desirable that the random selection made from the non-excluded set has an evenly distributed probability distribution among the non-excluded values so that there is no significant bias towards one non-excluded value or another.

Figure 8:
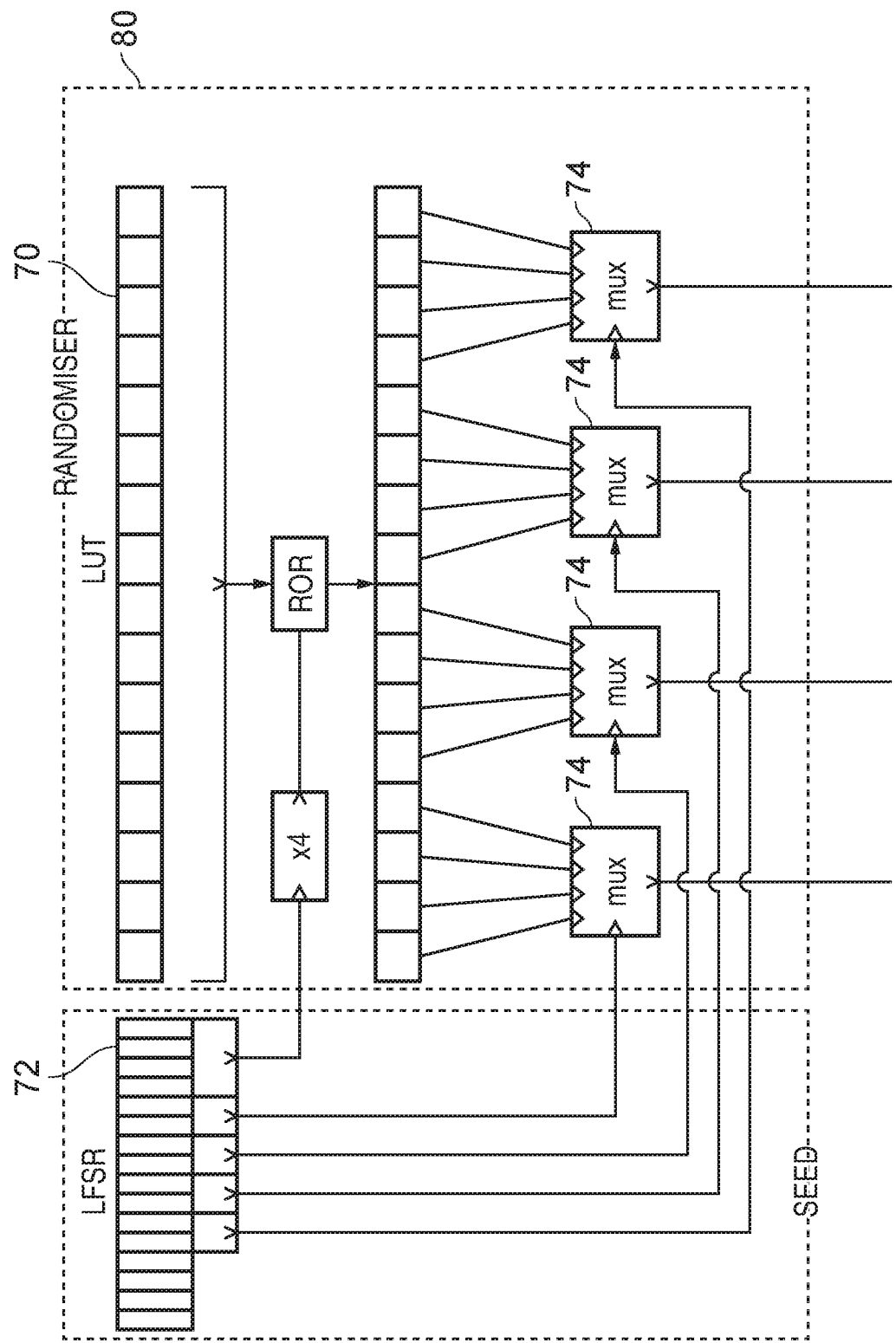
FIGS. 8 to 10 illustrate example hardware implementations for selecting a random tag value from a set of candidate values while excluding at least one excluded value from being selected.
Figure 8:
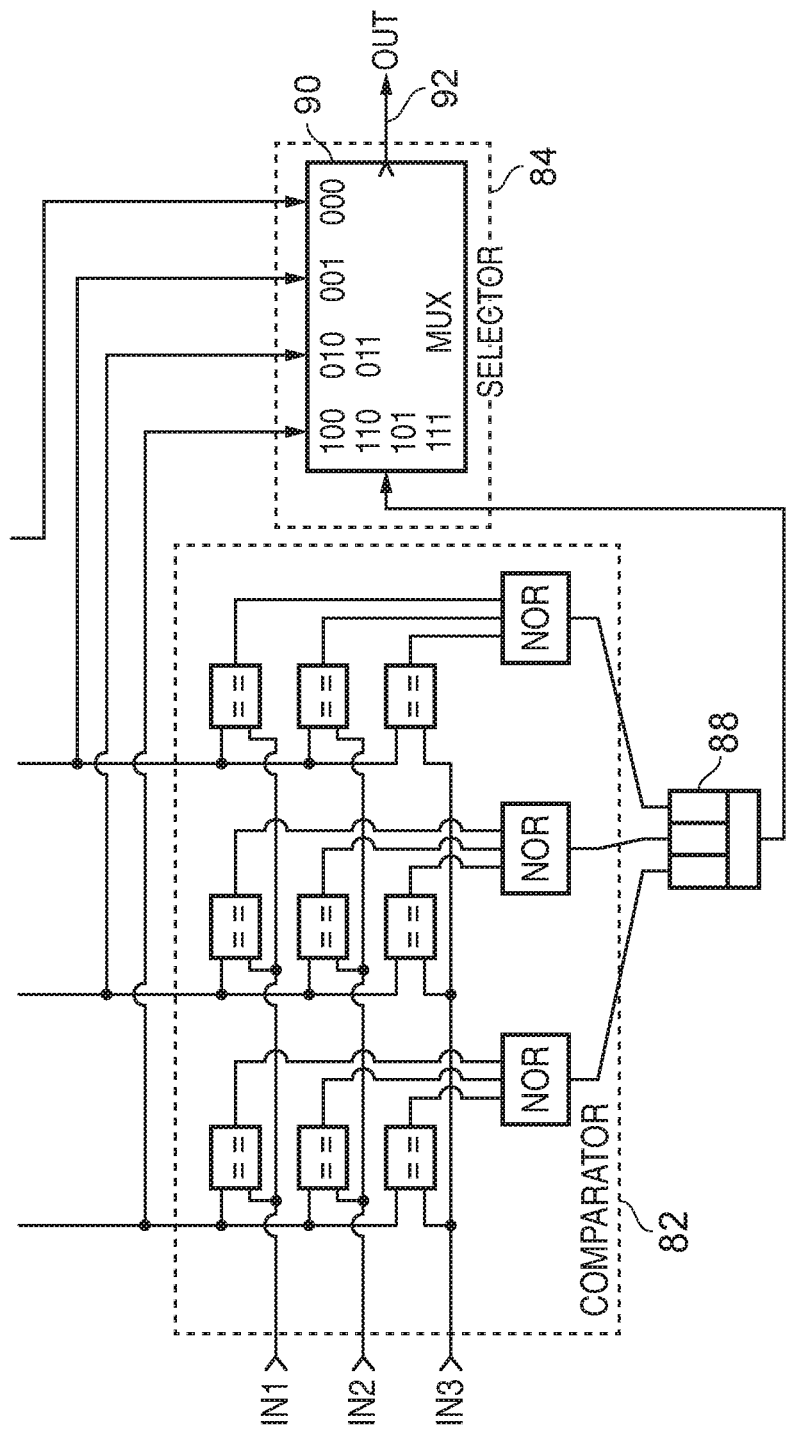
Figure 9:
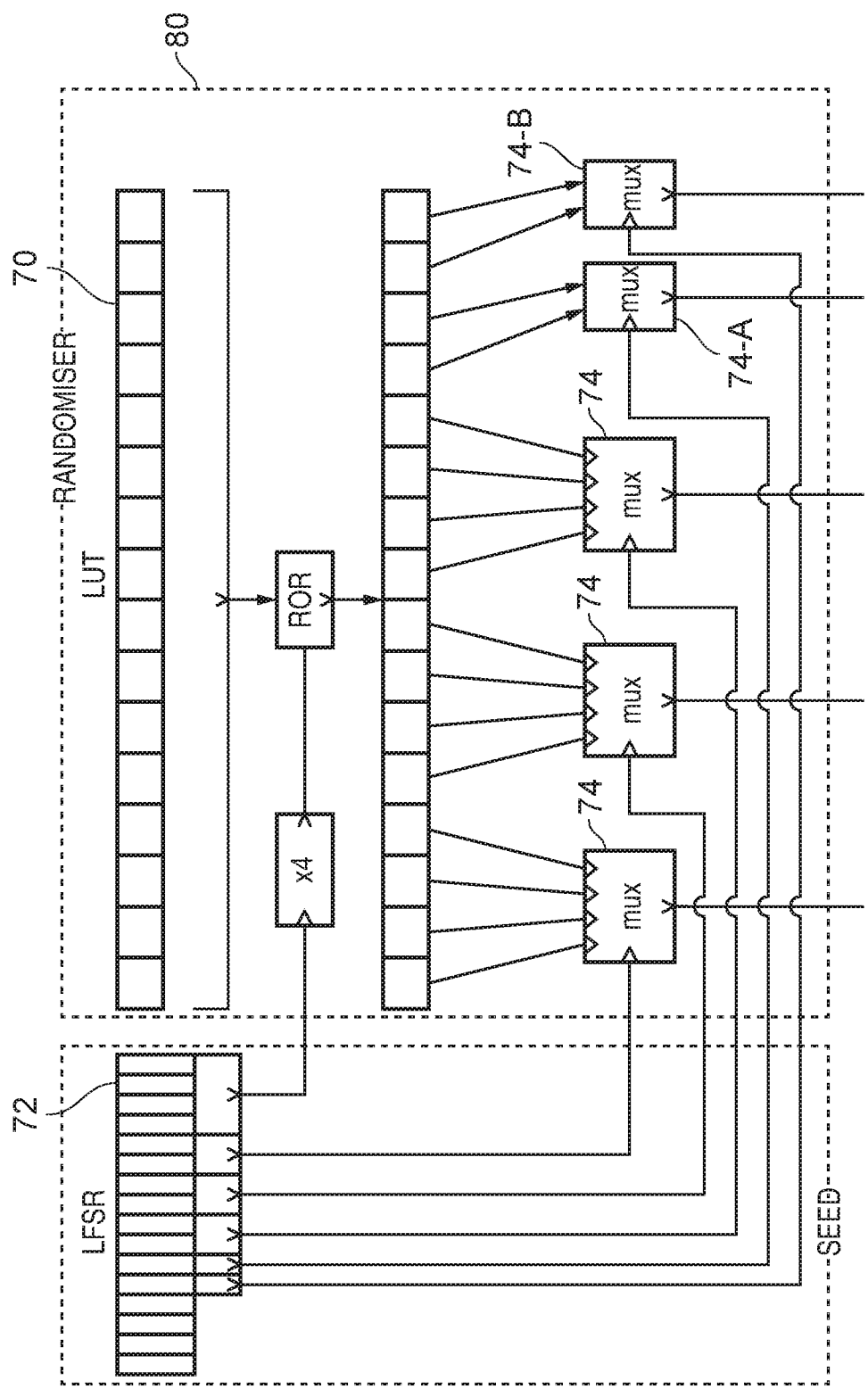
Figure 9:
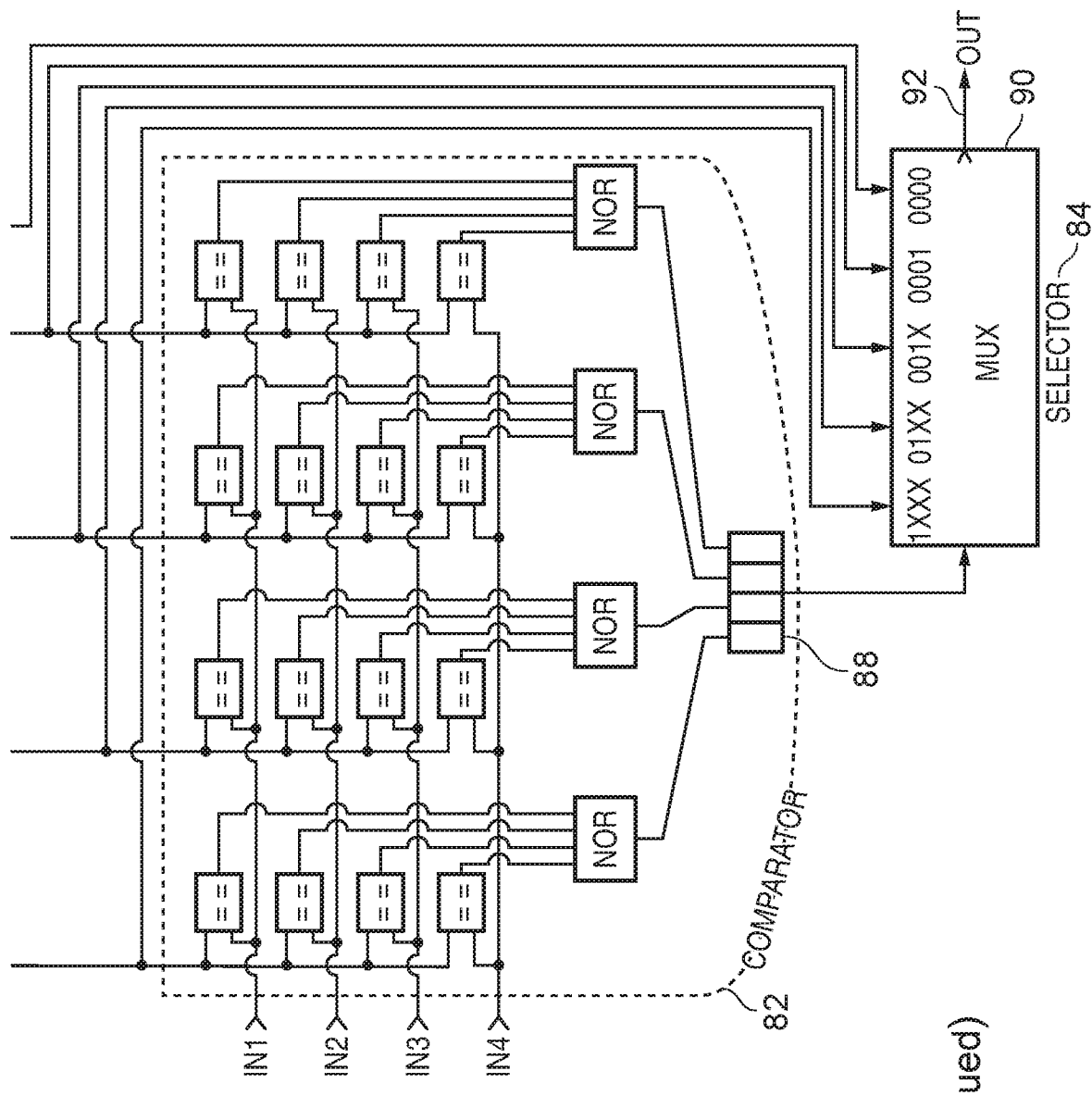
Figure 10:
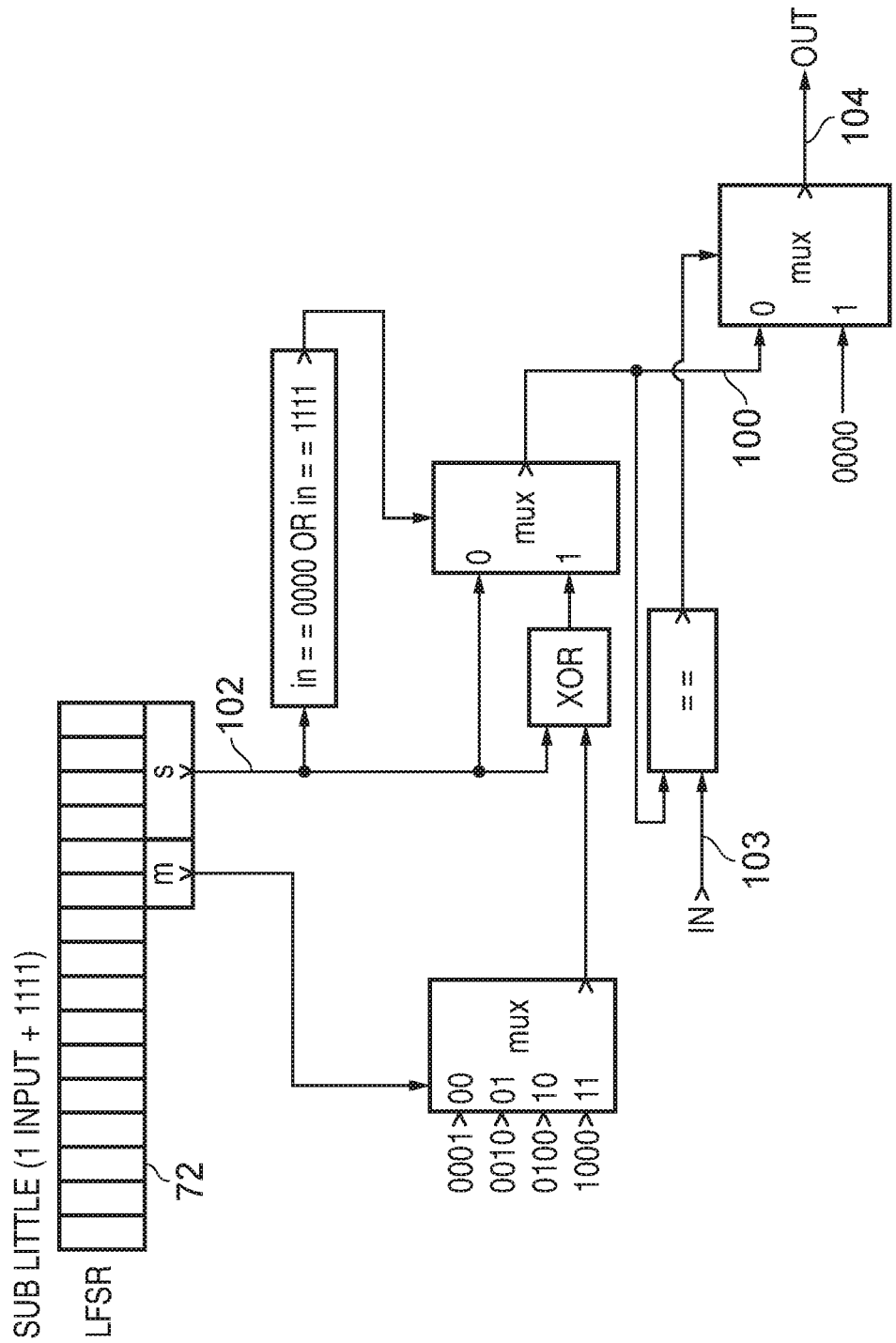

FIGS. 8 to 10 show a number of approaches for achieving this. The aim is to provide a hardware-efficient way to generate 4-bit pseudorandom values, which should not be equal to specific input values. Specifically, this covers how to derive such an output from a non-discriminating source of randomness (that allows all possible outputs). This could be a simple LFSR seed register or a more sophisticated (P)RNG. For simplicity, the source of randomness will be referred to as a "LFSR", although other sources of randomness could also be used instead of the LFSR. Two possible approaches to implementation are described. A first approach described uses a predefined pseudorandom sequence (look-up-table or LUT 70), which could be hardwired, in addition to the LFSR 72, and is capable of excluding an arbitrary number of input values (with hardware complexity growing depending on the maximum number of inputs). A second approach is also described, which is limited to excluding only 1 input value along with either `1111` or `0000`. It derives its output from the LFSR only.

The first approach is illustrated in FIGS. 8 and 9. This design idea can be built to exclude any number of input patterns (`N`). First, we assume the presence of a look-up-table (LUT) register 70, which contains every possible output value exactly once, shuffled in pseudorandom order. For 4-bit outputs (16 combinations), this LUT 70 would be a 64-bit value. The design comprises 3 stages 80, 82, 84. The first stage is a randomiser 80, which selects `N+1` non-overlapping values out of the LUT 70, pseudo-randomly, based on bits of the LFSR 72. The second stage is a comparator 82. It compares for bit equality each of `N` of the `N+1` outputs from the randomiser 80 to each of the `N` inputs 86 defining the excluded values, to produce a mask. Note that the inputs 86 can be derived from random selection state information and/or configuration data in a configuration register and/or hardware-fixed values as discussed above. The last stage is a selector 84 which comprises a multiplexer 90 that uses the mask 88 produced by the comparator 82 to select one of the `N+1` outputs from the randomiser 80, which is not equal to any of the inputs (as indicated by its bit in the mask 88) as the ultimate final output 92. The final output 92 is used as the random tag value to set to the address tag of the tag setting target address.

The details of how to implement each stage are described below. This is an example implementation. Alternative implementations are possible.

Randomiser 80 (Stage 1)

Let `pos` be 4 bits are extracted from the LFSR 72. The LUT register 70 is rotated by `pos*4` bits. This is followed by `N+1` multiplexers 74, each selecting one of multiple independent values from the LUT, based on additional bits from the LFSR as needed. Ideally, all of these multiplexers 74 should have the same number of inputs, although this is not essential as shown in FIG. 9. Since bit rotation is implemented as a multiplexer in hardware anyway, both of these steps could be collapsed down and simplified.

Comparator 82 (Stage 2)

Each of the `N` inputs from the randomiser 80 is compared for equality with each of the `N` prohibited values. The results for every randomiser output are NORed together to produce the output mask 88.

Selector 84 (Stage 3)

The selector 90 can simply select the first randomiser output that is allowed by the mask 88.

Properties of Implementation

This implementation provides a uniform probability distribution for all outputs, including if some of the inputs are identical. This means that a single hardware circuit built to exclude N values could be reused for excluding fewer values, without affecting the probability distribution, by simply providing some of the inputs multiple times.

FIG. 8 shows a specific example configuration for 3 exclusions (N=3). This implementation provides a uniform probability distribution for all outputs, including if some of the inputs are identical. This means that a single hardware circuit built to exclude 3 values could be used for excluding 1 or 2 values, without affecting the probability distribution, by simply providing the same input multiple times. If the value to be excluded is `1111`, this is how the probability distribution is affected:

| value | 0000 | 0001 | 0010 | 0011 | 0100 | 0101 | 0110 | 0111 |
|---|---|---|---|---|---|---|---|---|
| % | 6.26 | 6.59 | 7.03 | 6.43 | 6.30 | 6.26 | 6.94 | 7.28 |

| value | 1000 | 1001 | 1010 | 1011 | 1100 | 1101 | 1110 | 1111 |
|---|---|---|---|---|---|---|---|---|
| % | 6.39 | 7.62 | 6.73 | 6.26 | 6.34 | 6.25 | 7.32 | 0.00 |

(the statistics were obtained with a LUT of `0x61fd50b4c83a2e97`)

FIG. 9 shows a specific example configuration for 4 exclusions (N=4). Note how, to provide the 5 outputs from the randomiser 80, the last multiplexer was chosen to be subdivided into two multiplexers 74-A, 74-B which each select from 2 LUT values rather than 4. This is because the last 2 outputs are the least likely to be picked by the selector, so decreased randomness there should have less of an effect on the probability distribution.

If the value to be excluded is `1111`, this is how the probability distribution is affected:

| value | 0000 | 0001 | 0010 | 0011 | 0100 | 0101 | 0110 | 0111 |
|---|---|---|---|---|---|---|---|---|
| % | 6.27 | 6.58 | 7.01 | 6.49 | 6.33 | 6.25 | 6.91 | 7.22 |

| value | 1000 | 1001 | 1010 | 1011 | 1100 | 1101 | 1110 | 1111 |
|---|---|---|---|---|---|---|---|---|
| % | 6.44 | 7.54 | 6.75 | 6.28 | 6.39 | 6.25 | 7.28 | 0.00 |

If an additional input to be excluded is `0000`, this is how the probability distribution is affected:

| value | 0000 | 0001 | 0010 | 0011 | 0100 | 0101 | 0110 | 0111 |
|---|---|---|---|---|---|---|---|---|
| % | 0.00 | 7.97 | 7.31 | 6.52 | 6.30 | 6.60 | 8.11 | 8.23 |

| value | 1000 | 1001 | 1010 | 1011 | 1100 | 1101 | 1110 | 1111 |
|---|---|---|---|---|---|---|---|---|
| % | 6.42 | 8.33 | 6.92 | 6.26 | 6.35 | 6.95 | 7.72 | 0.00 |

(the statistics were obtained with a LUT of `0x61fd50b4c83a2e97`)

FIG. 10 illustrates the second approach, which excludes one fixed pattern, which can be either `1111` or `0000`, and one input value, which is an arbitrary variable. This is sufficient for "re-colouring"/changing an existing value. The output is derived from the LFSR 72 only. The LFSR should have at least 6 bits.

In the design shown in FIG. 10, 4 bits are extracted from the LFSR state to be used as a tentative output value ("selected tag value") 102. If all of the bits are the same (patterns `0000`, `1111`), 2 more bits from the LFSR are extracted and used in a multiplexer/shifter to select exactly one bit of the output to be inverted (using XOR operation) to generate an intermediate value 100. This guarantees that the `0000` and `1111` patterns can never occur for the intermediate value 100. Otherwise, the selected tag value 102 is outputted as is as the intermediate value 100.

This produces an intermediate value 100 which has a pseudorandom output with the following statistical distribution:

| value | 0000 | 0001 | 0010 | 0011 | 0100 | 0101 | 0110 | 0111 |
|---|---|---|---|---|---|---|---|---|
| % | 0.0 | 7.8 | 7.8 | 6.3 | 7.8 | 6.3 | 6.3 | 7.8 |

| value | 1000 | 1001 | 1010 | 1011 | 1100 | 1101 | 1110 | 1111 |
|---|---|---|---|---|---|---|---|---|
| % | 7.8 | 6.3 | 6.3 | 7.8 | 6.3 | 7.8 | 7.8 | 0.0 |

To easier explain the next part of the system, assume that the fixed pattern to exclude is `1111` and that `0000` is a valid output. Since `0000` is a valid pattern, it can be swapped with the input variable. Hence, the intermediate value 100 is compared for equality to the input (the prohibited value defined by the random tag setting instruction). If they match, `0000` is outputted. Otherwise, the intermediate value 100 is outputted as is. This results in a final output 104 that is neither `1111` (since it was already excluded by the first step) nor equal to the input provided by the random tag setting instruction. The final output 104 can be used as the random tag value to set to the address tag of the target address.

The statistical distribution of the final output is:

| value | 0000 | 0001 | 0010 | 0011 | 0100 | 0101 | 0110 | 0111 |
|---|---|---|---|---|---|---|---|---|
| % | 6.7 | 7.3 | 7.3 | 5.8 | 7.3 | 5.8 | 5.8 | 7.3 |

| value | 1000 | 1001 | 1010 | 1011 | 1100 | 1101 | 1110 | 1111 |
|---|---|---|---|---|---|---|---|---|
| % | 7.3 | 5.8 | 5.8 | 7.3 | 5.8 | 7.3 | 7.3 | 0.0 |

The roles of `0000` and `1111` could be swapped, to prohibit `0000` as an output and use `1111` as a valid substitution for the variable input instead. Also, it would be possible for any arbitrary pattern (not just '0000' or '1111') to be selected as the predetermined excluded tag value (corresponding to '1111' in the example of FIG. 10) and the further predetermined tag value (corresponding to '0000' in FIG. 10) which is substituted for the intermediate value 100 if it matches the additional excluded tag value 103 defined by the random tag setting instruction.

In the above approaches, a single random tag setting instruction is able to take the indications of excluded values across the entire set of candidate values and select a random value from among the remaining values, in response to a single instruction. When paired with an additional instruction of the form shown in FIG. 7 to define the excluded values, this can provide a relatively code efficient way of implementing the selection.

Figure 11:
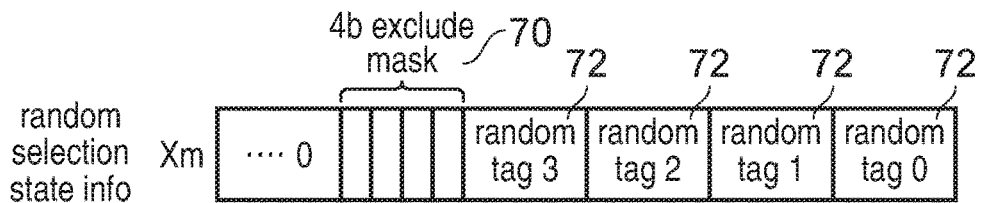
FIG. 11 shows a second example of the random selection state information which specifies values of a subset of candidate tag values and a corresponding bitfield indicating whether each of those values is excluded.

However, to further simplify the hardware, it may also be useful to split the operation for selecting the random tag value and excluding values from selection into multiple instructions. An example of this approach is shown in FIGS. 11 to 14. FIG. 11 shows an alternative form of the random selection state information for defining the excluded values for the random tag setting instruction. For example, the register Xm shown for the random tag setting instruction of FIG. 5 could specify the form of random selection state information shown in FIG. 11, instead of a bitfield as shown in FIG. 6. In the example of FIG. 11, rather than defining the excluded values across the entire set of candidate values, a bit mask 70 may be provided only for a proper subset of the candidate values, whose values are indicated by fields 72 of the random selection state information itself. In this context, a proper subset means a subset which excludes at least one of the values of the candidate set. In this example, both the proper subset of random tag values 72 and the corresponding exclusion mask 70 are stored within the same register, although other examples could store these in different registers.

Figure 12:
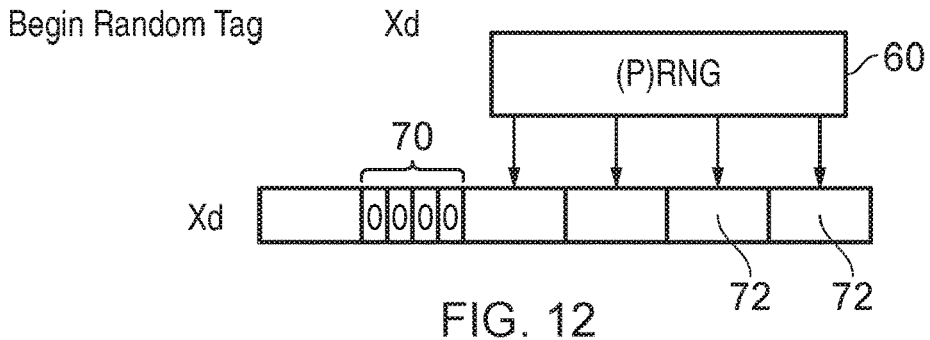
FIG. 12 shows an example of a random tag selecting instruction for populating the subset of candidate tag values with randomly selected values.
Figure 13:
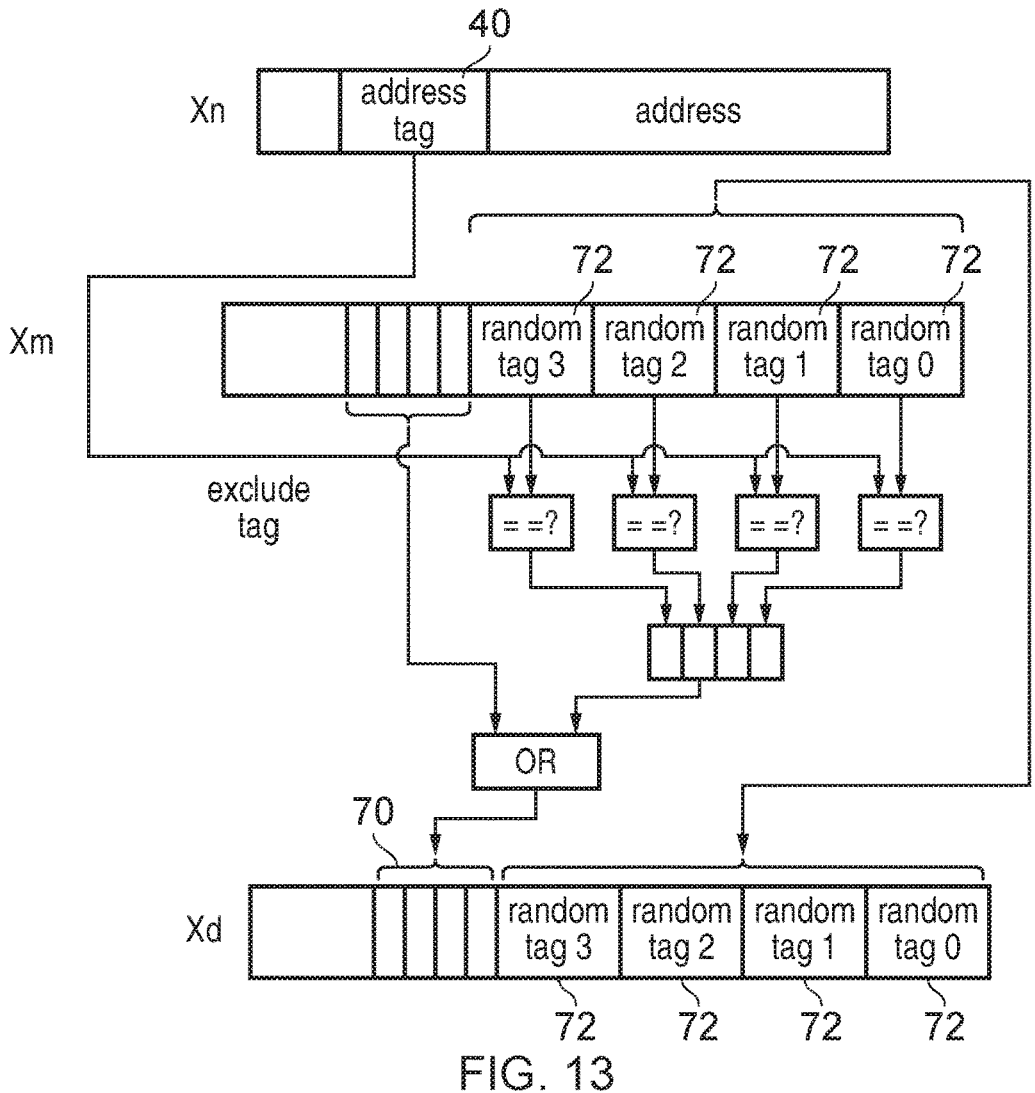
FIG. 13 shows a second example of the tag value excluding instruction for determining based on an address tag of an input address, whether any of the subset of candidate tag values indicated by the random selection state information should be excluded.
Figure 14:
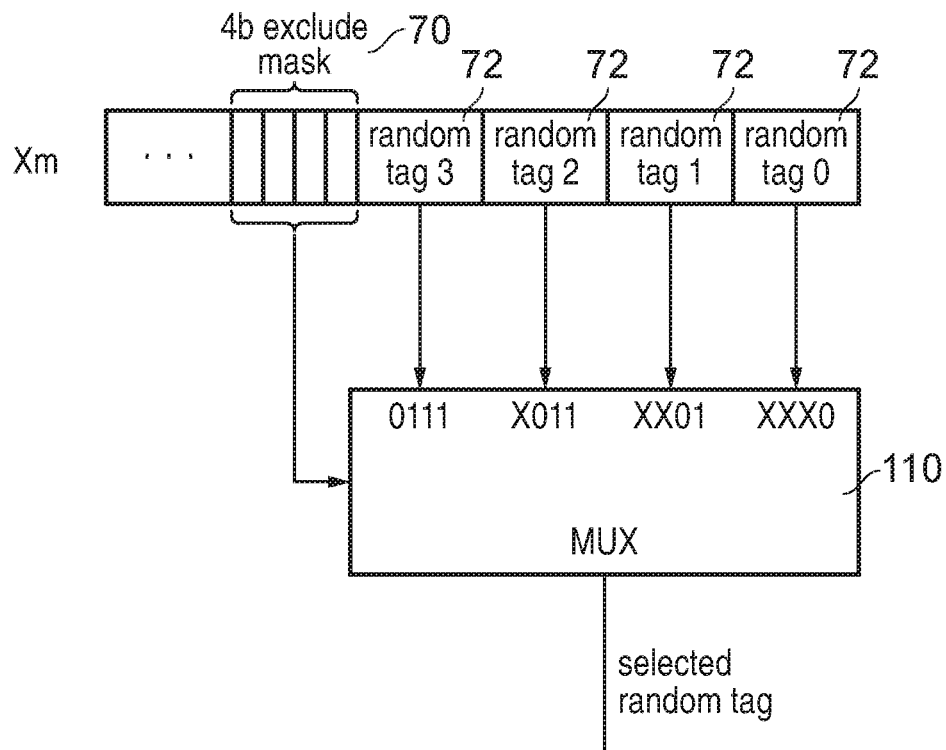
FIG. 14 shows another example of the random tag setting instruction for updating the tag value associated with a given address to a randomly selected value based on the random selection state information shown in FIG. 11.
Figure 14:
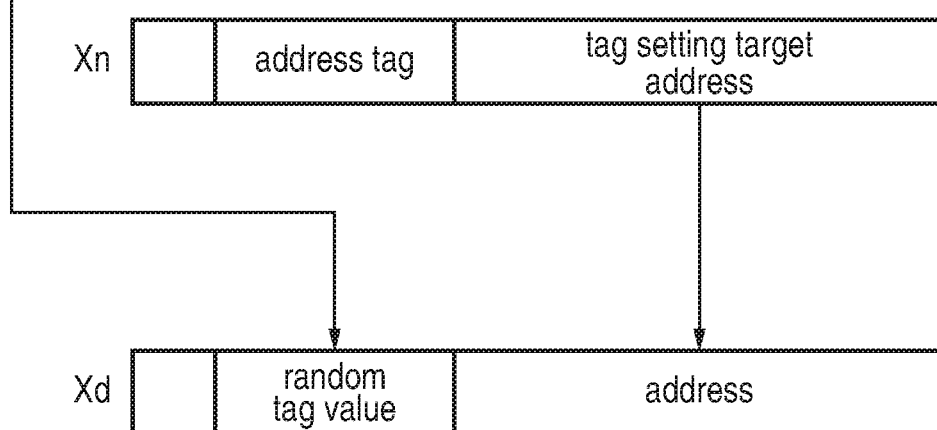

With this approach it is possible to divide the random selection operation into a number of instructions: a first instruction which selects a subset of random values as a working set of values available for selection by the subsequent random tag setting instruction, shown in FIG. 12; a second instruction which checks the previously selected subset of values against an excluded value and sets the exclusion mask if there is a match, shown in FIG. 13; and a third (random tag setting instruction) shown in FIG. 14, which uses the random selection state shown in FIG. 11 to select one of the subset of random tag values 72 that is not indicated as excluded by the exclusion mask.

FIG. 12 shows a BeginRandomTag (random tag selecting instruction) instruction specifying a destination register Xd, which chooses a small set of random tags based on the output of a random number generator or pseudo random number generator 60. There is no need to consider any software defined excluded values at this stage. In some implementations, the BeginRandomTag instruction could still exclude some values from being selected if they are defined as permanently excluded by hardware or if they are configurably defined as excluded using a configuration register. However by ignoring any software defined exclusions which depend on the tag associated with an input address provided by software, or which depend on the outcome of earlier instructions, this can simplify the hardware for implementing this instruction. Hence, in response to the instruction, the instruction decoder 6 controls the pseudo random number generator or random number generator 60 simply chooses a certain number of tag values, and controls the processing circuitry 4 to write the selected values to the corresponding random tag fields 72 of the destination register Xd. The exclusion mask 70 of the random selection state information is set to all 0 in response to the Begin-RandomTag instruction, to ensure that initially all of the selected values are indicated as non-excluded. Any remaining bits of the destination register can be zero-extended.

FIG. 13 shows an ExcludeRandomTag instruction (tag value excluding instruction) specifying two source registers Xn, Xm and a destination register Xd, which can be executed to ensure that a particular tag value defined by software may not be selected as the random tag value by a subsequent random tag setting instruction. This instruction can be similar to the one shown in FIG. 7, in that it takes, as a source register Xn, a register specifying an address which already has a tag value 40 set for it. In response to the instruction of FIG. 13, the instruction decoder 6 controls the processing circuitry 4 to extract the tag value 40 from the address in register Xn and compare the extracted tag value against each of the random tag values stored in the fields 72 of the random selection state information specified in the second source register Xm, and if the extracted address tag 40 matches any of the random tags 72 previously populated by the BeginRandomTag instruction then the corresponding bit of the exclusion mask 70 is set to 1 in the destination register Xd. The random tag values 72 themselves are simply written unchanged from the source register Xm to the destination register Xd. The ExcludeRandomTag instruction can be executed multiple times with different addresses in order to check whether more than one of the random tag values 72 should be excluded.

FIG. 14 shows a random tag setting instruction (EndRandomTag) which chooses, based on the random selection state stored in source register Xm, one of the remaining tags that has not been excluded by the ExcludeRandomTag instruction of FIG. 13, inserts the selected tag into an address specified in source register Xn, and writes the result to a destination register Xd. Hence, a multiplexer 110 may select between the subset of random tag values 72 specified in the register Xm depending on the values of the respective bits of the exclusion mask 70. Provided that a maximum of T−1 instances of the ExcludeRandomTag instruction between the BeginRandomTag instruction and the EndRandomTag instruction (where T is the number of random tags in the subset indicated in register Xm), then there will always be at least one random tag value which is not excluded and which can therefore be selected by the multiplexer 80 for insertion as the random tag value in the address specified in the destination register Xd.

Hence, by splitting the operation into several instructions this can make it easier to build processing hardware which meets timing requirements and which ensures that each instruction only needs to specify a maximum of 2 source registers (which can be useful for efficient use of register read ports), while still allowing more than 2 values extracted from respective address tags of input addresses to be excluded from selection.

It will be appreciated that all the example implementations shown above are just examples, and the architectural function of the random tag setting instruction which excludes certain values from being selected can also be implemented using other hardware implementations.

Figure 15:
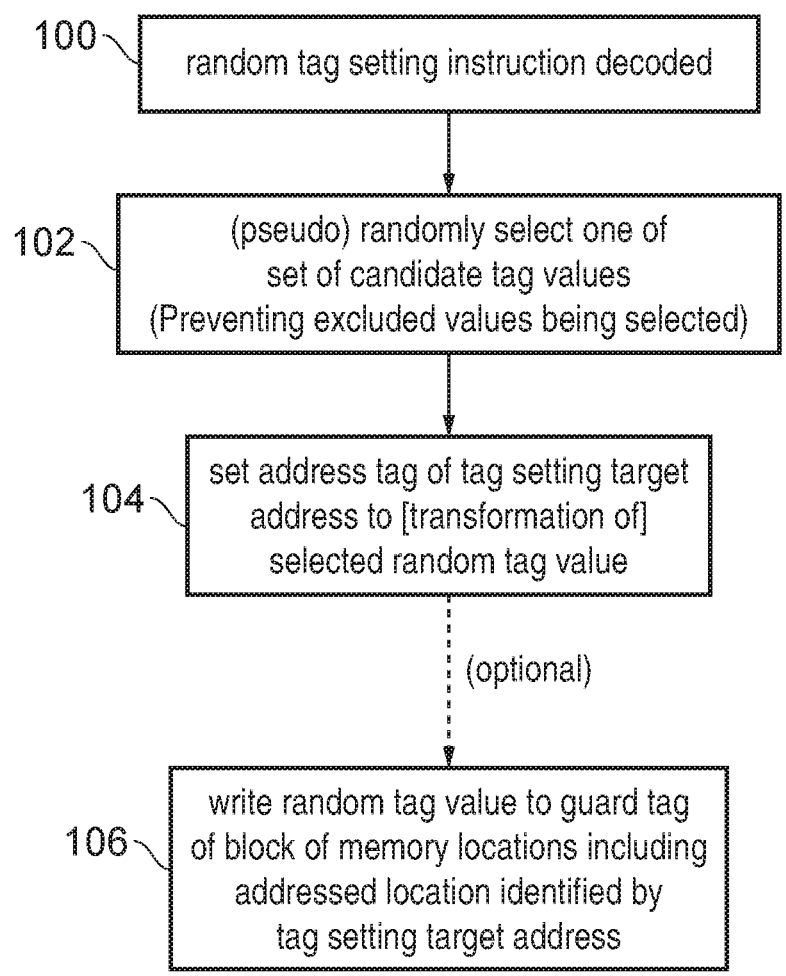
FIG. 15 shows a method of processing a random tag setting instruction.

FIG. 15 illustrates a flow diagram showing a method of processing a random tag setting instruction. At step 100, the instruction decoder 60 decodes the random tag setting instruction, which could be any of the forms of instruction shown above. At step 102 the decoder 6 controls the processing circuitry 4 to randomly or pseudo randomly select one of the set of candidate tag values. In some variants of the instructions, one or more excluded values may be prevented from being selected at step 102. Any of the ways of representing which values should be excluded can be used as discussed above. At step 104, the instruction decoder 6 controls the processing circuitry 4 to set the address tag for a tag setting target address to either the selected random tag value itself or a transformation of the selected random tag value. In some cases it may be desirable to transform the selecting random tag value based on bits or multiple bits of the tag setting target address itself. This can be useful in particular for the form of instruction which excludes some values from being selected because they are used as special hardware specific values. For example if a value is reserved as a "match all" value which is considered to match against any other value of the tag then in some implementations, it may be desirable to use different values as the match all value depending on the portion of the address space in which the address is found. For example, addresses with the most significant bit equal to 0 could use one value as the match all value and addresses with the most significant bit equal to 1 could use a different value as the match all value. This can simplify implementation while supporting legacy code operating as intended. By selecting the random value in the same way at step 102 regardless of the particular tag setting target address, but then subsequently applying a transformation (such as an inversion of the bits) depending on other bits of the address, this can enable the legacy functionality to work as originally intended by the legacy code without unnecessarily complicating the random selection step 102.

Optionally, at step 106 the guard tag associated with the corresponding block of memory locations including the addressed location identified by the tag setting target address could also be set to the random tag value. Hence, in response to the random tag setting instruction the instruction decoder 6 can also control the memory access circuitry 15 to write the random tag value to the location storing the guard tag associated with the addressed location.

Figure 16:
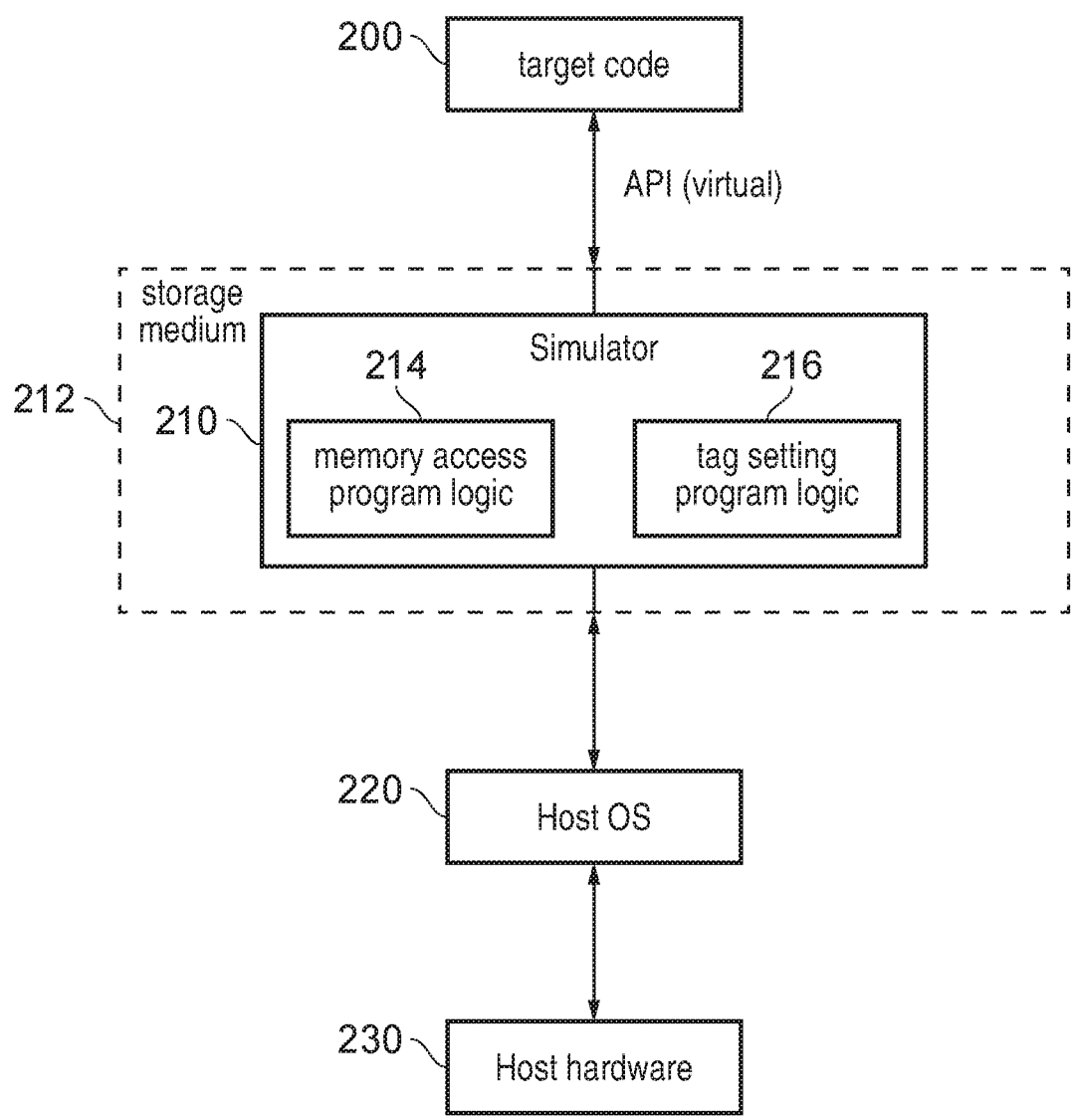
FIG. 16 shows an example of a simulator supporting the random tag setting instruction.

FIG. 16 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium 212 (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200, including the random tag setting instruction described above, may be executed from within the instruction execution environment using the simulator program 210, so that a host computer 230 which does not actually have the hardware features of the apparatus 2 discussed above can emulate these features. For example, the simulator program 210 may include memory access program logic 214 for controlling access to memory by instructions of the target code 200. For example, the memory access program logic 214 may include instructions for performing the comparison of the guard tag and the address tag and reporting whether any mismatch between the guard tag and address tag has been detected. Also, the simulator program 210 may include tag setting program logic 216, which comprises instructions for triggering, in response to a random tag setting instruction included in the target code 200, an address tag associated with a tag setting target address to a randomly selected value as discussed above, in a corresponding way to the way in which the hardware embodiment would set the address tag.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry;
memory access circuitry to perform a guard tag check for a tag checking target address having an associated address tag, the guard tag check comprising comparing the address tag with a guard tag stored in a memory system in association with a block of one or more memory locations comprising an addressed location identified by the target address and triggering an error handling response or error reporting mechanism when a mismatch is detected between the guard tag and the address tag; and
an instruction decoder responsive to a random tag setting instruction specifying a tag setting target address, to control random tag selection hardware to randomly select a random tag value from a set of candidate tag values, and to control the processing circuitry to set the address tag associated with the tag setting target address to the random tag value randomly selected from the set of candidate tag values;
in which, in response to the random tag setting instruction, the instruction decoder is configured to control the random tag selection hardware to prevent at least one excluded value of the set of candidate tag values from being selected as the random tag value, and to randomly select the random tag value from a remaining subset of the candidate tag values;
in which the at least one excluded tag value includes one or more excluded tag values identified by at least one register specified by the random tag setting instruction.

2. The apparatus according to claim 1, in which the at least one excluded tag value includes a tag value corresponding to an address tag associated with an address specified in a source register or a destination register of the random tag setting instruction.

3. The apparatus according to claim 1, in which the at least one excluded tag value comprises one or more excluded tag values identified by configuration data stored in a configuration register; or
one or more hardware-defined excluded tag values.

4. The apparatus according to claim 1, in which the at least one excluded tag value comprises a maximum of N excluded tag values, and in response to the random tag setting instruction, the instruction decoder is configured to control the random tag selection hardware to:
randomly select at least N+1 tag values of the set of candidate tag values;

compare each of the selected tag values against the at least one excluded tag value; and
select one of the selected tag values which mismatches against all of the at least one excluded tag values as the random tag value to set to the address tag associated with the tag setting target address.

5. The apparatus according to claim 1, in which the at least one excluded tag value comprises a predetermined excluded tag value, and an additional excluded tag value specified by the random tag setting instruction; and
  in response to the random tag setting instruction, the instruction decoder is configured to control the random tag selection hardware to:
    randomly select one of the set of candidate tag values as a selected tag value;
    perform a comparison of the additional excluded tag value against an intermediate value which is one of:
      the selected tag value, when the selected tag value mismatches both the predetermined excluded tag value and a further predetermined tag value of the set of candidate tag values; and
      a value obtained by inverting a randomly selected bit of the selected tag value, when the selected tag value matches one of the predetermined tag value and the further tag value;
    when the comparison detects a mismatch between the additional excluded tag value and the intermediate value, output the intermediate value as the random tag value to set to the address tag associated with the tag setting target address; and
    when the comparison detects a match between the additional excluded tag value and the intermediate value, output the further predetermined tag value as the random tag value to set to the address tag associated with the tag setting target address.

6. The apparatus according to claim 1, in which the random tag selection hardware is configured to pseudo-randomly select the random tag value from the set of candidate tag values.

7. The apparatus according to claim 1, in which in response to the random tag setting instruction, the instruction decoder is also configured to control the memory access circuitry to update, to the random tag value, the guard tag stored in a memory system in association with a block of one or more memory locations comprising an addressed location identified by the tag setting target address.

8. The apparatus according to claim 1, in which the guard tag check comprises returning a fault status indication when a mismatch is detected between the address tag and the guard tag.

9. The apparatus according to claim 1, in which the address tag associated with the tag checking target address is represented by a subset of bits of the tag checking target address; and
  in response to the random tag setting instruction, the instruction decoder is configured to control the processing circuitry to update a subset of bits of the tag setting target address based on the random tag value.

10. The apparatus according to claim 9, in which the subset of bits of the tag setting target address are updated to a transformed tag value corresponding to a transformation of the random tag value dependent on at least one other bit of the tag setting target address.

11. The apparatus according to claim 1, in which, in the guard tag check, the addressed location is selected independent of the address tag associated with the tag checking target address.

12. A non-transitory storage medium storing a computer program for controlling a host data processing apparatus to provide an instruction execution environment for execution of instructions of target program code, comprising:
  memory access program logic to perform a guard tag check for a tag checking target address having an associated address tag, the guard tag check comprising comparing the address tag with a guard tag stored in a memory system in association with a block of one or more memory locations comprising an addressed location identified by the target address and triggering an error handling response or error reporting mechanism when a mismatch is detected between the guard tag and the address tag; and
  tag setting program logic responsive to a random tag setting instruction specifying a tag setting target address, to control random tag selection program logic to randomly select a random tag value from a set of candidate value, and to set the address tag associated with the tag setting target address to the random tag value randomly selected from the set of candidate tag values;
  in which, in response to the random tag setting instruction, the tag setting program logic is configured to control the random tag selection program logic to prevent at least one excluded value of the set of candidate tag values from being selected as the random tag value, and to randomly select the random tag value from a remaining subset of the candidate tag values;
  in which the at least one excluded tag value includes one or more excluded tag values identified by at least one register specified by the random tag setting instruction.

13. An apparatus comprising:
  processing circuitry;
    memory access circuitry to perform a guard tag check for a tag checking target address having an associated address tag, the guard tag check comprising comparing the address tag with a guard tag stored in a memory system in association with a block of one or more memory locations comprising an addressed location identified by the target address and triggering an error handling response or error reporting mechanism when a mismatch is detected between the guard tag and the address tag; and
    an instruction decoder responsive to a random tag setting instruction specifying a tag setting target address, to control random tag selection hardware to randomly select a random tag value from a set of candidate tag values, and to control the processing circuitry to set the address tag associated with the tag setting target address to the random tag value randomly selected from the set of candidate tag values;
  in which, in response to the random tag setting instruction, the instruction decoder is configured to control the random tag selection hardware to prevent at least one excluded value of the set of candidate tag values from being selected as the random tag value, and to randomly select the random tag value from a remaining subset of the candidate tag values;
  in which the random tag setting instruction specifies at least one source register storing random selection state information;
  the random selection state information comprising a bit-field comprising a plurality of bits corresponding to at least a subset of the set of candidate tag values, each bit of the bitfield indicating whether the corresponding candidate tag value is one of said at least one excluded tag value.

14. The apparatus according to claim 13, in which the instruction decoder is responsive to a tag value excluding instruction specifying a tag excluding target address and a destination register for storing the bitfield of the random selection state information, to control the processing circuitry to update a bit of the bitfield corresponding to the address tag associated with the tag excluding target address to indicate that the corresponding tag value is one of said at least one excluded tag value.

15. The apparatus according to claim 13, in which the bitfield comprises bits corresponding to the entire set of candidate tag values.

16. The apparatus according to claim 13, in which the bitfield comprises bits corresponding to a proper subset of candidate tag values, and the random selection state information also comprises the tag values of said proper subset of candidate tag values.

17. The apparatus according to claim 16, in which the tag values of said proper subset of candidate tag values are specified in the same register as the bitfield.

18. The apparatus according to claim 16, in which the instruction decoder is responsive to a random tag selecting instruction specifying a destination register for storing the tag values of the random selection state information, to control the processing circuitry to randomly select the proper subset of candidate tag values from among the set of candidate tag values, and to write the tag values of the selected proper subset of candidate tag values to the destination register.

* * * * *